(12) United States Patent
Kumar et al.

(10) Patent No.: US 12,731,077 B2
(45) Date of Patent: Sep. 8, 2026

(54) DOMAIN-SPECIFIC HALLUCINATION DETECTION AND CORRECTION FOR MACHINE LEARNING MODELS

(71) Applicant: BMC Helix, Inc., Houston, TX (US)

(72) Inventors: Ajoy Kumar, Santa Clara, CA (US); Himanshu Singhvi, Pune (IN); Priya Saurabh Talwalkar, Pune (IN)

(73) Assignee: BMC Helix, Inc., Houston, TX (US)

( * ) Notice: Subject to any disclaimer, the term of this patent is extended or adjusted under 35 U.S.C. 154(b) by 665 days.

(21) Appl. No.: 18/194,547

(22) Filed: Mar. 31, 2023

(65) Prior Publication Data

US 2024/0330755 A1 Oct. 3, 2024

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 10,109,297 B2 10/2018 Brown et al.
10,347,244 B2 7/2019 Goel et al.
11,042,794 B2 6/2021 Allen et al.
11,113,323 B2 9/2021 Yoon et al.
2018/0285768 A1* 10/2018 Karuppasamy ........ G06N 20/00
2019/0347282 A1* 11/2019 Cai ........................ G06N 5/022
2021/0328888 A1* 10/2021 Rath ....................... G06F 18/22
2022/0038351 A1* 2/2022 Jasionowski ....... H04L 41/5019
2022/0156462 A1 5/2022 Mcnamara et al.
2024/0119220 A1* 4/2024 Aggarwal ................ G06N 3/08
2024/0184988 A1* 6/2024 Sridhar .................. G06F 16/36
(Continued)

FOREIGN PATENT DOCUMENTS

WO 2020091619 A1 5/2020
WO 2022191982 A1 9/2022

OTHER PUBLICATIONS

Extended European Search Report for European Application No. 24165670.1, mailed Jul. 29, 2024, 7 pages.
(Continued)

*Primary Examiner* — Chikaodili E Anyikire
(74) *Attorney, Agent, or Firm* — Brake Hughes Bellermann LLP

(57) ABSTRACT

An incident ticket having a worklog field for a resolution field and a worklog providing a history of actions taken during attempts to resolve an incident may be received. The incident ticket may be processed using a domain-specific machine learning model trained using training data that includes a plurality of resolved incident tickets, to thereby generate at least one resolution statement. Source data used by the domain-specific machine learning model in providing the at least one resolution statement may be determined, the source data including one of the worklog and the training data. A hallucination score may be assigned to the at least one resolution statement, based on the source data, to identify hallucinated content within the at least one resolution statement. The at least one resolution statement may be modified to remove the hallucinated content and thereby obtain a resolution for inclusion in the resolution field.

20 Claims, 11 Drawing Sheets

| Sentence | Similarity | #h.words/total | Hallucination score |
| --- | --- | --- | --- |
| Provided informational assistance on how to enable pop up credential pop-up for windows 10 KBA00021006 | 0.52 | 0.2 (KBA, windows) | 0.34 |
| User was not able to login to outlook for work or school KBA00005312 | 0.39 | 0.5 (KBA) | 0.55 |
| Assisted user to open more choices on pop up and enter password. | 1 | 0 | 0 |
| Worked for user | 0.74 | 0 | 0.13 |

(56) References Cited

U.S. PATENT DOCUMENTS

| | | | | |
|---|---|---|---|---|
| 2024/0275699 | A1* | 8/2024 | Titon | H04L 41/0654 |
| 2024/0330661 | A1* | 10/2024 | Rahman | G06N 3/044 |
| 2025/0184242 | A1* | 6/2025 | Kudeti | G06F 18/23213 |

OTHER PUBLICATIONS

Alkaissi et al.: "Artificial Hallucinations in ChatGPT: Implications in Scientific Writing," Cureus, DOI: 10.7759/cureus.35179, Feb. 19, 2023, 4 pages.

BMC Software: "Learning about Incident Management—Documentation for BMC Helix ITSM: Smart IT 21.05," available online at <https://docs.bmc.com/docs/smartit2105/learning-about-incident-management-1002909060.html>, Mar. 29, 2023, 8 pages.

Brooks et al.: "Got It AI, Got It AI Develops AI to Identify and Address ChatGPT Hallucinations for Enterprise Applications," available online at <https://www.globenewswire.com/en/news-release/2023/01/13/2588735/0/en/Got-It-AI-Develops-Alto-Identify-and-Address-ChatGPT-Hallucinations-for-Enterprise-Applications.html>, Jan. 13, 2023, 4 pages.

D. Takahashi: "Got It AI creates truth checker for ChatGPT 'hallucinations'," available online at <https://venturebeat.com/ai/got-it-ai-creates-truth-checker-for-chatgpt-hallucinations/>, Jan. 13, 2023, 7 pages.

Dziri et al.: "Neural Path Hunter: Reducing Hallucination in Dialogue Systems via Path Grounding," arXiv:2104.08455, Sep. 14, 2021, 18 pages.

J. Mathenge: "Incident Management: The Complete Guide," available online at <https://www.bmc.com/blogs/incident-management/>, Mar. 25, 2021, 8 pages.

Liu et al.: "Assessing the Value of ChatGPT for Clinical Decision Support Optimization," medRxiv preprint doi: https://doi.org/10.1101/2023.02.21.23286254, Feb. 23, 2023, 20 pages.

Liu et al.: "A Token-level Reference-free Hallucination Detection Benchmark for Free-form Text Generation," Proceedings of the 60th Annual Meeting of the Association for Computation Linguistics, vol. 1, Long Papers, May 31, 2022, pp. 6723-6737.

M. Anderson: "Preventing 'Hallucination' in GPT-3 and Other Complex Language Models," available online at <https://www.unite.ai/preventing-hallucination-in-gpt-3-and-other-complex-language-models/>, Dec. 9, 2022, 8 pages.

Menick et al.: "Teaching language models to support answers with verified quotes," Deep Mind, arXiv preprint arXiv:2203.11147, Mar. 31, 2022, 40 pages.

Shuster et al.: "Retrieval Augmentation Reduces Hallucination in Conversation," arXiv preprint arXiv:2104.07567, Apr. 15, 2021, 21 pages.

* cited by examiner

| Sentence | Similarity | #h.words/total | Hallucination score |
|---|---|---|---|
| Provided informational assistance on how to enable pop up credential pop-up for windows 10 KBA00021006 | 0.52 | 0.2 (KBA, windows) | 0.34 |
| User was not able to login to outlook for work or school KBA00005312 | 0.39 | 0.5 (KBA) | 0.55 |
| Assisted user to open more choices on pop up and enter password. | 1 | 0 | 0 |
| Worked for user | 0.74 | 0 | 0.13 |

New incident ticket
407
Domain specific LLM
408
Resolution
412
Hallucination detection and removal
410
Text Generation Tuning parameters
406
Training
404
Domain training data
402
Domain metadata
416
Service, category tier, product name, KB articles, KB URLs, KB titles
Domain vocabulary
414
Domain specific nouns, verbs, entities
418
418a
418b
418c
418d
Clusters using metadata
Past resolution insights
420

| Service | Cat | Input text | Output text | Input sim. | Source Corpus Semantic Similarity | Source Corpus Word overlap | OOV | OOD | Domain Metadata | Tuning parameter | Predicted hallucination |
|---|---|---|---|---|---|---|---|---|---|---|---|
| | | | | | | | | | | | |
| | | | | | | | | | | | |
| | | | | | | | | | | | |

DOMAIN-SPECIFIC HALLUCINATION DETECTION AND CORRECTION FOR MACHINE LEARNING MODELS

TECHNICAL FIELD

This description relates to generative machine learning (ML) models.

BACKGROUND

ML models have been developed that enable content generation of many different types. For example, some ML models enable chatbots or other software designed to interact with human users in a natural, interactive manner. Some ML models are designed to generate articles, essays, or other compositions, in response to a provided prompt or topic. In other examples, some ML models are designed to provide brief summaries of larger pieces of existing content. Although these and other types of ML models may have wide applicability, it may be difficult to implement many such ML models in the context of specific domains of knowledge.

For example, the domain of Information Technology (IT) incident handling may refer to, or include, structured processes followed by organizations or other entities to restore various IT services to specified operating levels. Attempts to apply general-purpose ML models to the IT incident handling domain, or other specific domain, may result in inaccurate results, or may consume excessive resources to train the ML models. In other examples, general-purpose ML models may simply be unable to provide a type of result that is specific to the domain in question, such as when training data of sufficient quality is not available. For example, in the IT incident handling domain, it may be difficult or impossible for a general-purpose ML model to generate an accurate, actionable resolution for resolving a specific IT incident.

SUMMARY

According to one general aspect, a computer program product may be tangibly embodied on a non-transitory computer-readable storage medium and may include instructions that, when executed by at least one computing device, are configured to cause the at least one computing device to receive an incident ticket of an incident domain, the incident ticket having a resolution field and a worklog field for a worklog providing a history of actions taken during attempts to resolve an incident, and process the incident ticket using a domain-specific machine learning model trained using training data that includes a plurality of resolved incident tickets, to thereby generate at least one resolution statement. When executed by the at least one computing device, the instructions may be configured to cause the at least one computing device to determine source data used by the domain-specific machine learning model in providing the at least one resolution statement, the source data including one of the worklog and the training data, assign a hallucination score to the at least one resolution statement, based on the source data, to identify hallucinated content within the at least one resolution statement, and modify the at least one resolution statement to remove the hallucinated content and thereby obtain a resolution for inclusion in the resolution field.

According to other general aspects, a computer-implemented method may perform the instructions of the computer program product. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 9A is a table that may be used to train a hallucination detector classifier in example implementations.

DETAILED DESCRIPTION

Figure 1:
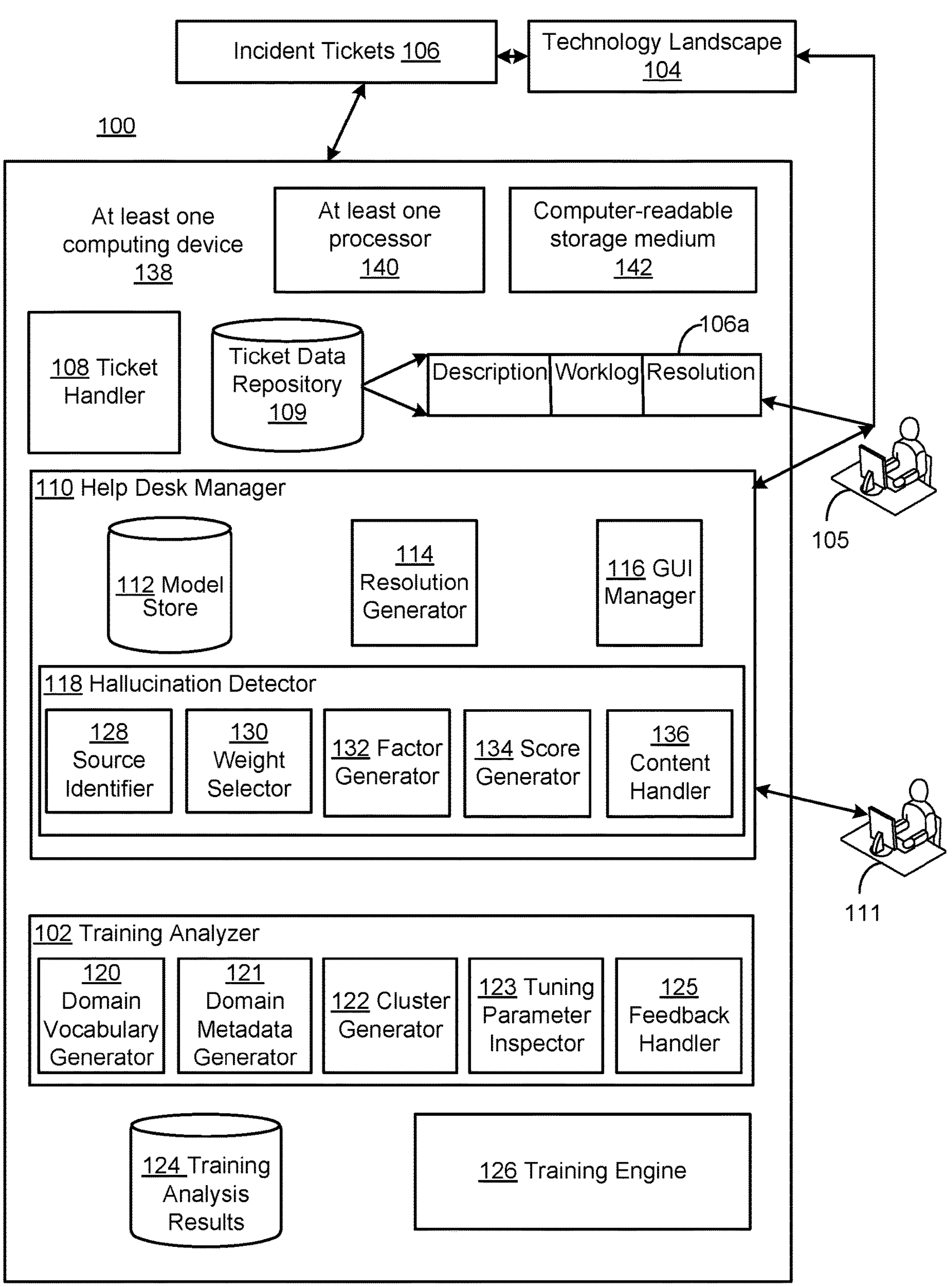
FIG. 1 is a block diagram of a hallucination detection and correction system for domain-specific machine learning models.

Described systems and techniques provide fast and accurate detection of hallucinated results, at runtime, for domain-specific or domain-adapted machine learning (ML) models, including large language models (LLMs) used to generate outputs of desired types and quantities of content in response to received inputs. By limiting trained LLMs to a specified domain, described techniques enable real-time hallucination detection as results are generated, even when a ground truth answer is not available. Moreover, described techniques enable dynamic adaptation of described techniques over time, so that hallucination detection accuracy may constantly be improved.

As referenced above, open-ended or general purpose LLMs attempt to provide many different types of outputs across many different types of input from many different domains. Such general purpose LLMs may be prone to included hallucinated content that is irrelevant at best and factually incorrect at worst, with respect to a received input and desired output.

The term hallucination in the present description thus refers to output text from a LLM that is unfaithful to, or not justified by, a source or input text and/or training data, or that is factually incorrect. Causes of hallucination in the context of LLMs, or in machine learning in general, are not fully understood, and may vary among different use case scenarios.

Consequently, efforts are being made to prevent LLMs from producing hallucinated content. For example, a producer of a conventional LLM may test output content generated from an input against a ground truth output that corresponds to the input. Then, if hallucination is determined, the LLM may receive additional or alternative training to try to improve the accuracy of the LLM. In the hopes of avoiding hallucinated output content being generated and to try to improve the conventional LLM, the producer may provide more training data in the subject matter of the hallucination to be used as input.

Such efforts have not been fully successful, and hallucination continues to be problematic. For example, a hallucinated output may be stated definitively as true by a trained LLM, causing a user to believe an incorrect answer. For example, in the context of incident handling, a LLM model may output an actionable resolution to an incident that does not solve the incident, or that makes the incident worse. Thus, a user may waste time and effort trying to implement the solution, or may misconfigure or otherwise damage already-problematic components, rather than fix them.

As referenced above, described techniques enable real-time or runtime detection of hallucinated content, even when no ground truth content is available for comparison, thereby preventing users from making the types of mistakes just referenced, while conserving available resources. Moreover, described techniques can be used to provide source citations for generated content, so as to facilitate and enhance trust in the generated content.

As described in more detail, below, described techniques provide a domain-specific or domain-adapted LLM(s) that provides accurate output content within a corresponding domain. In particular, described techniques enable detection and removal of hallucinated content in real time, at a time that the output content is generated. Moreover, such hallucination detection dynamically adapts and improves over time, and may be optimized with respect to defined domain contexts within the domain.

In the present description, the term domain refers generally to any designated sphere of activity or knowledge in which a known subset of information can be defined or recognized. Accordingly, many different domains may use, and benefit from, techniques described herein.

For the sake of clarity and conciseness, various examples provided herein relate to an incident handling domain, such as IT incident handling or human resources (HR) incident handling. Other example domains may be provided or referenced, as well. However, it will be appreciated that the term domain includes any context within a business, organizational, academic, legal, governmental, technical, or other setting in which a corpus of designated, relevant data is available.

FIG. 1 is a block diagram of a hallucination detection and correction system for domain-specific machine learning models 100. In FIG. 1, a training analyzer 102 is configured to work in conjunction with training operations for domain-specific machine learning models, to determine or derive information that may later be used for purposes of hallucination detection and removal, and/or for providing source citations in conjunction with generated output.

In more detail, in FIG. 1, a technology landscape 104 may represent any suitable source of incident tickets 106, submitted by various users represented in FIG. 1 by a user 105, that may be processed by the training analyzer 102, in conjunction with training operations conducted by a training engine 126, as described below. A ticket handler 108 may be configured to receive the incident tickets 106 over time, in conjunction with handling of the related incidents by a help desk manager 110 and associated incident agent 111, with the incident tickets 106 ultimately being stored in a ticket data log record repository 109.

For example, the technology landscape 104 may include many types of network environments, such as network administration of a private network of an enterprise, or an application provided over the public internet or other network. Technology landscape 104 may also represent scenarios in which sensors, such as internet of things devices (IoT), are used to monitor environmental conditions and report on corresponding status information (e.g., with respect to patients in a healthcare setting, working conditions of manufacturing equipment or other types of machinery in many other industrial settings (including the oil, gas, or energy industry), or working conditions of banking equipment, such as automated transaction machines (ATMs)). In some cases, the technology landscape 104 may include, or reference, an individual IT component, such as a laptop or desktop computer or a server. In some embodiments the technology landscape 104 may represent a mainframe computing environment, or any computing environment of an enterprise or organization conducting network-based IT transactions.

The incident tickets 106 may thus represent any tickets related to any incident that may be experienced by the user 105 with respect to any of the various hardware or software components just referenced. In addition, as already noted, the incident tickets 106 may represent incidents occurring in any suitable context other than the technology landscape 104, for which incident resolution may be facilitated by the incident agent 111. For example, such incidents may include a HR incident.

FIG. 1 illustrates that an individual incident ticket 106*a* of the incident tickets 106 may include multiple fields for storing associated types of data. In the example, the incident ticket 106*a* includes a description field, a worklog field, and a resolution field, which are thus designated for containing associated types of ticket content for the incident ticket 106*a*. Although other terminology may be used for such ticket fields, and additional or alternative ticket fields may be included, as well, as described below, the incident ticket 106*a* illustrates that ticket content for an individual incident ticket is generally accumulated over time during a lifecycle of the incident ticket 106*a* in question.

For example, when the incident ticket 106*a* is first submitted by the user 105, the user 105 may be required to provide content for the description field, to provide context and explanation for the incident the user 105 is experiencing. The description may be brief and/or may be detailed, or there may be separate fields for brief and detailed descriptions.

The worklog field refers to an audit history of actions of, and interactions between, the user 105 and the incident agent 111, during the lifecycle of the incident ticket 106*a*. The worklog may include attempted resolutions performed by the incident agent 111, messages (e.g., emails or chat messages) between the user 105 and the incident agent 111, or written, recorded-audio, or auto-transcribed text of audio communications between the user 105 and the incident agent 111. The worklog may also include interactions between the incident agent 111 and other incident agents, or between the incident agent 111 and external sources of potential resolutions for the incident in question, such as knowledge base (KB) articles or various resources available on the internet.

The resolution field is designed and intended to include a resolution of the incident that caused the incident ticket 106*a* to be generated. For example, the incident agent 111 may be responsible for entering whatever resolution was ultimately responsible for resolving and closing the incident ticket 106*a*. Once the incident ticket 106*a* is resolved and closed, the incident ticket 106*a* may be stored in the ticket data repository 109, as already referenced.

To the extent that the resolution field is required to be filled by the human incident agent 111, it becomes possible or likely that the resolution field will be filled out incorrectly or incompletely. For example, it may occur that the incident agent 111 is required to handle a large volume of the incident tickets 106, perhaps in an overlapping fashion and/or within a relatively short period of time, and perhaps across multiple applications or other use-case scenarios. Consequently, once the incident ticket 106*a* is resolved, the incident agent 111 may be eager to complete the incident ticket 106*a* and move on to another one of the incident tickets 106.

For these and other reasons, the incident agent 111 may be prone to providing insufficient, incomplete, or incorrect resolution content within the resolution field. For example, the incident agent 111 may leave the resolution field blank. Even if the help desk manager 110 implements a requirement for the incident agent 111 to fill out the resolution field, the incident agent 111 may circumvent this requirement by entering some minimum quantity of data, such as "incident resolved," necessary to close the incident ticket 106*a*.

To minimize or avoid such outcomes, a training engine 126 may be configured to use incident ticket data in the ticket data repository 109, which may be preprocessed to remove extraneous data or otherwise improve a quality of the stored incident ticket data. Accordingly, the help desk manager 110 may be provided with one or more trained, domain-specific LLMs stored in a model store 112. That is, resulting trained LLMs may be domain-specific at least in the sense that they are trained using the incident ticket data from the ticket data repository 109.

Once such domain-specific LLMs have been trained and deployed, a resolution generator 114 may be configured to implement the domain-specific LLMs to assist the user 105 and/or the incident agent 111, e.g., via a graphical user interface (GUI) provided by a GUI manager 116, in processing current and future incident tickets 106*a* of the incident tickets 106.

For example, the user 105 may submit the incident ticket 106*a* via a suitable GUI, together with a description of the incident in the description field. The user 105 and the incident agent 111 may then work (together or separately) to resolve the incident, while simultaneously compiling corresponding worklog content for the worklog field of the incident ticket 106*a*. The resolution generator 114 may use a suitable domain-specific model from the model store 112 at any point in the lifecycle of the incident ticket 106*a* to generate a resolution for the relevant incident.

For example, the resolution generator 114 may be capable of generating a potential resolution in response to the description provided by the user 105, i.e., at a beginning of the lifecycle of the incident ticket 106*a*. Even as the incident ticket 106*a* is being processed by the incident agent 111 and the worklog content for the worklog field is developed, the developing worklog content may intermittently or continuously be processed by the resolution generator 114 and generate potential resolutions.

In other examples, once a suitable resolution is determined (as judged by the user 105), the resolution generator 114 may generate a suitable summary or representation of the resolution in conjunction with, or following, a closing of the incident ticket. In other words, it may occur that the successful resolution is included in some form within the worklog content of the worklog field, perhaps together with earlier attempted resolutions that were partially or completely unsuccessful. As noted above, conventional techniques simply rely on the incident agent 111 to provide a suitable summary or other representation of the successful resolution, but such approaches are subject to human error. In contrast, by generating a suitable resolution to include in the resolution field of the incident ticket 106*a*, the resolution generator 114 ensures that the incident ticket 106*a* includes content that will provide high-quality training data for purposes of continued training or other updates to the domain-specific LLMs of the model store 112.

Thus, the resolution generator 114 may use the domain-specific LLMs of the model store 112 to generate resolutions for new incident tickets 106*a*, as just described. In such cases, the new incident tickets 106*a* may therefore include high-quality resolution content to be included in training operations of the training engine 126. Nonetheless, as referenced above and described in more detail below, the generated resolutions may also contain hallucinated content that may be misleading or incorrect, and that may thus complicate or prevent a successful resolution of a current incident.

To facilitate and provide such hallucination detection and related benefits, a hallucination detector 118 of the helpdesk manager 110 may leverage training analysis results 124 of the training analyzer 102. That is, conventional LLMs may be trained using a suitable training engine and associated training data, and improvements to conventional LLMs may be pursued, e.g., by improving the specific training techniques being used, perhaps in the hopes of avoiding hallucinated output content being generated.

In contrast, described techniques analyze existing training data and training techniques, before and during performance of such training, and use results of such analyses, e.g., the training analysis results 124, to enable hallucination detection and removal. Described techniques further use the training analysis results 124, e.g., to enable source citations from within training data when generating potential incident resolutions, so as to provide trust in a validity of the generated incident resolutions.

To provide the above and other features, the training analyzer 102 may be configured to analyze training data in the ticket data repository 109 and/or training operations of the training engine 126, to thereby obtain the training analysis results 124. The hallucination detector 118 may use the training analysis results 124 to provide the types of hallucination detection, removal, and support described herein.

In more detail, the training analyzer 102 may include a domain vocabulary generator 120 that is configured to analyze the ticket data repository 109 and generate a domain vocabulary of words and phrases to include in the training analysis results 124. In the context of IT incident handling, verbs such as restart, reboot, log, or certify may be included, or nouns such as Virtual Private Network (VPN), workstation, email, and so on.

In addition to the ticket data repository 109, various other sources of domain vocabulary may be used, not necessarily shown in FIG. 1. For example, relevant KB articles, asset models, and service models may be used. In addition to the above, domain vocabulary terms may include various, abbreviations, and acronyms determined to be relevant.

Additional vocabulary information may be captured as well, for example, for each word in the domain vocabulary, a term frequency (TF) per document and an inverse document frequency (IDF) may be determined, so that highly common words will have low IDF scores while rare words will have high IDF scores.

A domain metadata generator 121 may be configured to identify metadata characterizing incident tickets in the ticket data repository 109, which may then be included in the training analysis results 124. Domain metadata may thus include any field or other characteristic of an incident ticket(s) 106*a*, including, e.g., related services or products. Incidents resolved using KB articles (and associated URLs or titles) may be identified. Incidents may be identified based on a type or incident or resolution, or based on one or more users 105, incident agents 111, or other personnel involved in resolving the incident(s). Incidents may be identified with respect to escalation events, mean time to resolution (MTTR), priority level, or any included or relevant feature or status.

A cluster generator 122 may be configured to then generate clusters of incident tickets based on the domain metadata and/or domain vocabulary. Such clusters are described in more detail below, and illustrated, e.g., with respect to FIG. 8. For example, the cluster generator 122 may provide a cluster of incident tickets sharing any category or combination of categories of metadata provided by the domain metadata generator 121. For example, clusters may be formed using the description or detailed description fields of the incident tickets 106*a*.

To give more specific examples, the cluster generator 122 may define a VPN cluster of incident tickets 106*a* related to VPN-related incidents, with other clusters related to, e.g., Microsoft (MS) Teams, MS Outlook, or any other relevant application or service. In such examples, a resulting VPN cluster may include VPN-related terms, such as, e.g., "restarting laptop," "certificate," or "certificate role." Some such terms may be highly unique to the VPN context or cluster, while others may also be likely to appear in other clusters.

A tuning parameter inspector 123 may be configured to identify values and combinations of values of tuning parameters used by the training engine 126 during fine-tuning of a relevant LLM. In the context of LLMs, a parameter may generally refer to variables or values that may be independently updated during training of an LLM. A tuning parameter, which may also be referred to as a hyper-parameter, refers to a type of parameter used to control a speed, quality, and/or other characteristic of the learning process of the LLM in question.

Tuning parameters used during training to obtain a trained LLM for inclusion in the model store 112 may be captured by the tuning parameter inspector 123 and stored in the training analysis results 124. Such tuning parameters may be set manually (e.g., using known best practices or empirically) and/or automatically (e.g., using some optimization function(s)).

As the tuning parameters influence a speed, quality, and/or other characteristics of the training processes, the tuning parameters may reflect various tradeoffs and design choices inherent in most or all development efforts. For example, some tuning parameters may cause a resulting model to be trained faster, at the expense of an accuracy of the resulting model. In other examples, some tuning parameters may cause the model to be more predictable or repetitive, at the expense of being less likely to generate a correct answer (e.g., resolution). In other examples, some tuning parameters may cause the model being trained to consume fewer computing resources, which may impact a time needed to train and/or the accuracy of the resulting model.

In some cases, manual or automated processes for setting tuning parameters, or combinations of tuning parameters, may result in unexpected or undesired outcomes for the resulting model. In particular, the processes for setting tuning parameters may result in tuning parameters that are likely to result in hallucinated content being produced or output by the model being trained.

By populating the training analysis results 124 with domain vocabulary, domain metadata, generated clusters, and relevant tuning parameters, the training analyzer 102 enables the hallucination detector 118 to detect hallucinated outputs provided by the LLM, e.g., within resolutions generated by the resolution generator 114 when using a model from the model store 112. Detailed examples of operations of the hallucination detector 118 are provided below, but in general, the hallucination detector 118 may access the training analysis results 124 to initialize or otherwise parameterize hallucination detection operations.

As the hallucination detector 118 operates, a feedback handler 125 of the training analyzer 102 may be configured to receive hallucination detection results, either from the hallucination detector 118 and/or from the incident agent 111. For example, the hallucination detector 118 may detect a false positive hallucination or a false negative hallucination, as may be provided and/or verified by the incident agent 111.

The feedback handler 125 may then receive an indication of such results and may be configured to update one or more of the domain vocabulary generator 120, the domain metadata generator 121, the cluster generator 122, and/or the tuning parameter inspector 123. For example, a resolution statement may be determined to be hallucinated in part for containing a word that was out of the domain vocabulary, but the statement may be retained by the incident agent 111. Then, the feedback handler 125 may cause the domain vocabulary generator 120 to update the domain vocabulary in the training analysis results 124 to include the relevant word. Other example operations of the feedback handler 125 are provided below or would be apparent.

As referenced above, the hallucination detector 118 operates in response to, or in conjunction with, generation of output from an LLM. In the following examples, such output is generally referred to in the context of a generated resolution provided by the resolution generator 114 for populating the resolution field of the ticket 106*a*, using a LLM from the model store 112. However, other types of content may be output as well, examples of which are also provided below.

Examples of inputs to the resolution generator 114 are generally provided as coming from either the description field or the worklog field of the ticket 106*a*. That is, as already described, the description field (which may represent one or both of an initial description or a detailed description) may be provided by the user 105 and may describe an issue experienced by the user 105, such as "cannot connect to VPN." As already mentioned, the worklog field of the ticket 106*a* may contain an audit history of interactions between the user 105 and the incident agent 111, as well as of actions taken by the incident agent 111 taken to try to resolve the issue, such as "re-enrolled certificate."

In the following description, when the resolution generator 114 generates a resolution from the worklog field, the resulting generated resolution is referred to as in-source. That is, the worklog contains the type of audit history just referenced, including one or more actions taken that resulted in successful resolution of the incident. The worklog may thus be processed by the resolution generator 114 and summarized from just the perspective of the successful resolution. In a simple example, the generated resolution may include a single statement of a single successful action taken, or, in more complex examples, may include some combination of two or more sentences describing two or more actions taken together that solved the incident.

In contrast, when the resolution generator 114 generates a resolution from the description field, the resulting generated resolution is referred to as out-of-source. For example, in the example above, if the description field includes text identifying a problem, such as "cannot connect to VPN," the resolution generator 114 may implement a LLM to generate a possible resolution based on its previous training, and utilizing knowledge obtained or inferred from the training data used to train the LLM, e.g., the incident tickets 106 of the ticket data repository 109.

Thus, an initial operation of the hallucination detector 118 in response to a resolution being generated is to execute a source identifier 128 that is configured to determine whether the generated resolution is generated from a description (e.g., out-of-source) or a worklog (e.g., in-source). Of course, these are just examples, and other inputs may be used as well, and may similarly be classified as being either in-source, out-of-source, or some combination thereof, by the source identifier 128.

The hallucination detector 118 may then proceed to analyze each statement of the resolution to determine whether the statement includes one or more hallucinated words or other content. In the present description, the term statement should be understood to refer generally to any sentence, phrase, or sentence fragment, which may be as short as one word and/or which may be separated from adjacent content by any suitable punctuation.

To determine whether a resolution statement being analyzed includes hallucinated content or not, the hallucination detector 118 may be configured to generate a hallucination score for the statement, where the score may be generated as a weighted sum of hallucination factors, also referred to as factors. In FIG. 1, weights of the weighted sum of hallucination factors may be determined by a weight selector 130, while values of the various hallucination factors may be determined by a factor generator 132, so that a score generator 134 may then generate a composite hallucination score for the resolution statement in question.

For example, a hallucination score for a statement may be calculated using an equation: alpha*(1-source_similarity)+beta*(source word overlap)+gamma*(Out of Vocabulary (OOV))+delta*(Out of Domain (OOD)_metadata)+epsilon (1-input_similarity)+theta*(OOD)+zeta*(text_generation_tuning_parameters), which is referred to herein as the hallucination equation. In the hallucination equation, the terms alpha, beta, gamma, delta, epsilon, theta, and zeta are examples of weights that may be determined by the weight selector 130. Similarly, source_similarity, source word overlap, OOV, OOD_metadata, OOD, input-similarity, and text_generation_tuning_parameters, are examples of factors that may be determined by the factor generator 132. In example implementations, each of the values of the various hallucination factors may be normalized, e.g., to have a value between 0 and 1.

Examples of the various hallucination factors are provided in more detail, below. In general, the source_similarity factor refers to a measure or characterization of similarity between the resolution statement being analyzed and a source of the resolution statement, as identified by the source identifier 128. For example, for in-source examples such as when the resolution statement is generated from a corresponding worklog, similarity between the resolution statement and the worklog may be used to determine a value for the source_similarity factor.

For out-of-source examples such as when the resolution statement is generated from a corresponding description, similarity may be determined between the resolution statement and one or more sources within the training data (e.g., the ticket data repository 109), as determined using the training analysis results 124. For example, a source may be identified by the source identifier 128 as existing within a cluster of training data identified by the cluster generator 122, such as the VPN cluster. Then, the factor generator 132 may calculate a similarity between the resolution statement and relevant content within the identified VPN cluster.

Similarity may be calculated using one or more techniques and included in the hallucination equation with a weight denoted as alpha. For example, semantic similarity algorithms such as cosine similarity and or word2vec may be used. One or more separately trained similarity models may be used, as well, such as a sentence-embedding model or an LLM trained to determine whether the generated resolution statement entails from, is neutral with respect to, or contradicts the source text. Other similarity determination techniques may be used, as well.

The source word overlap factor refers to a proportion of words in the resolution statement that do not appear within the identified source, e.g., (#hallucinated words/#total words resolution statement) and is included in the hallucination equation with a weight denoted as beta. In calculating the source word overlap, stop words may be omitted, and inflections of a word may be avoided by using lemmas or stems of the word.

The OOV factor may be used to quantify a proportional number of words in the resolution statement that are not included in the domain vocabulary of the training analysis results 124, as determined by the domain vocabulary generator 120, and is included in the hallucination equation with a weight denoted as gamma. The OOV factor may be calculated based on included nouns, verbs, and entities of the domain vocabulary, while omitting stop words and word inflections, words such as "on," "to," or "for."

Similarly, the Out of Domain (OOD)_metadata factor represents a score indicating an extent to which the resolution statement text that is generated includes KB article identifiers, URLs, services, or categorical data that is not present in the source corpus's metadata, in the training analysis results 124, as determined by the domain metadata generator 120. The OOD_metadata factor is included in the hallucination equation with a weight denoted as delta.

The input_similarity factor represents a similarity between a current input, such as a question within the description field of the incident ticket 106*a*, and corresponding inputs within the training data. The input_similarity factor is included in the hallucination equation with a weight denoted as epsilon.

The OOD factor quantifies a similarity between the current incident ticket 106*a*, including, where applicable, the description, worklog, and/or resolution statement(s) and comparison training data within a same domain (e.g., cluster). For example, the source identifier 128 may identify a particular cluster of the cluster generator 122 as including source material for the resolution statement being tested, which may include multiple source incident tickets 106 within a cluster. Then, from within this cluster, maximally similar source material may be selected, and then compared against the current generated resolution to determine a proportion of words within the current generated resolution that are not included within the selected source material, relative to the number of words (omitting stop words and word inflections) within the current generated resolution. The OOD factor is included in the hallucination equation with a weight denoted as theta.

The text_generation_tuning_parameters factor may be determined based on tuning parameters (or hyper-parameters) determined by the tuning parameter inspector 123 and included in the training analysis results, as described above. As described in detail, below, the various individual tuning parameters may themselves each be assigned an importance, weight, or distribution, and aggregated for inclusion as the single text_generation_tuning_parameters factor. The text_generation_tuning_parameters factor is included in the hallucination equation with a weight denoted as zeta.

The corresponding weights alpha, beta, gamma, delta, epsilon, theta, and zeta may be determined using one or more of a number of techniques. For example, an administrator may manually set the weights, e.g., using the GUI manager 116 and the weight selector 130. The weights may be set automatically by the weight selector 130, based on a context and/or content of the training analysis results 124.

In other examples, as described below, the weight selector 130 may be implemented as a classifier. Then, the various weights may be set to initial values, and then optimized during subsequent uses of the hallucination detector 118, e.g., based on feedback from the incident agent 111. In some cases, multiple sets of weights may be determined, and used correspondingly in different use cases (e.g., in different domains).

The score generator 134 may use the determined weights and factors of the hallucination equation to generate a composite hallucination score for a resolution statement. In some implementations, the hallucination score may be compared to a threshold value. For example, in the hallucination equation, a high similarity score is considered good, while all remaining factors are desired to have low scores. By including an inverse similarity score of (1-source_similarity), the hallucination equation may be designed to indicate a likelihood of hallucination occurring when the composite hallucination score exceeds the determined threshold value.

A content handler 136 may be configured to modify the resolution statement being tested or otherwise manage interactions with the incident agent 111, based on the hallucination score calculated by the hallucination equation. For example, when the hallucination score exceeds the threshold, the content handler 136 may delete the corresponding resolution statement from the generated resolution. When the hallucination score does not exceed the threshold and the resolution statement is generated from OOD, the content handler 136 may provide the incident agent 111 with a reference to relevant source material within the training data of the ticket data repository 109, e.g., using the clusters of the training analysis results 124.

The content handler 136 may also be configured to enable and receive feedback from the incident agent 111. For example, rather than deleting a resolution statement with a high hallucination score, the content handler 136 may present the resolution statement to the incident agent 111 and receive feedback from the incident agent 111 as to whether identified hallucinated content (including individual words and/or entire statements) represents a false positive, and/or whether a resolution statement includes a false negative of hallucinated content. Such feedback may be explicit or implicit (such as when the incident agent 111 accepts a generated resolution without change). The content handler 136 may receive such feedback to optimize future operations of the training analyzer 102 and/or the hallucination detector 118.

In FIG. 1, the training analyzer 102 and the hallucination detector 118 are illustrated as being implemented using at least one computing device 138, including at least one processor 140, and a non-transitory computer-readable storage medium 142. That is, the non-transitory computer-readable storage medium 142 may store instructions that, when executed by the at least one processor 140, cause the at least one computing device 138 to provide the functionalities of the training analyzer 102, the hallucination detector 118, and related functionalities.

For example, the at least one computing device 138 may represent one or more servers or mainframes. For example, the at least one computing device 138 may be implemented as two or more servers in communications with one another over a network, or as two or more virtual machines in a mainframe. Accordingly, the training analyzer 102, the help desk manager 110 (including the hallucination detector 118), and the training engine 126 may be implemented using separate devices in communication with one another. In other implementations, however, although the training analyzer 102 is illustrated separately from the help desk manager 110, it will be appreciated that some or all of the respective functionalities of either the training analyzer 102 or the help desk manager 110 may be implemented partially or completely in the other, or in both.

Figure 2:
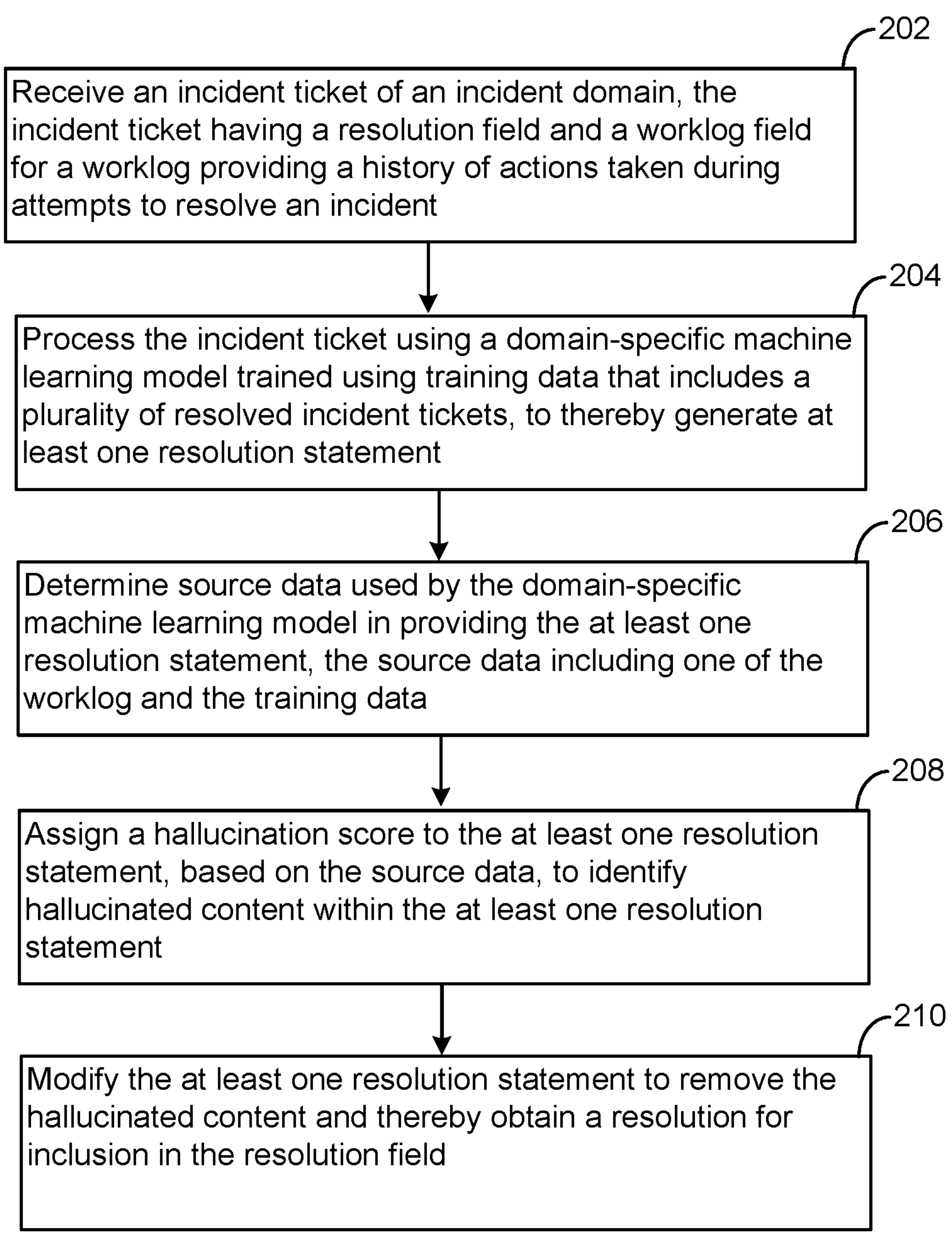
FIG. 2 is a flowchart illustrating example operations of the system of FIG. 1.

FIG. 2 is a flowchart illustrating example operations of the hallucination detection and correction system for domain-specific machine learning models 100 of FIG. 1. In the example of FIG. 2, operations 202 to 210 are illustrated as separate, sequential operations that include an iterative loop. In various implementations, the operations 202 to 210 may include sub-operations, may be performed in a different order, may include alternative or additional operations, or may omit one or more operations.

In FIG. 2, an incident ticket of an incident domain may be received, the incident ticket having a resolution field and a worklog field for a worklog providing a history of actions taken during attempts to resolve an incident (202). For example, the resolution generator 114 may receive the incident ticket 106*a*.

The incident ticket may be processed using a domain-specific machine learning model trained using training data that includes a plurality of resolved incident tickets, to thereby generate at least one resolution statement (204). For example, the resolution generator 114 may use a domain-specific LLM of the model store 112 to output a resolution of multiple resolution statements (e.g., sentences) to populate the resolution field of the incident ticket 106*a*. As described with respect to FIG. 1, the domain-specific LLM may be trained using the training engine 126 to process some or all of the ticket data repository 109. In conjunction with such training operations, and using the training data, the training analyzer 102 may generate the training analysis results 124.

Source data used by the domain-specific machine learning model in providing the at least one resolution statement may be determined, the source data including one of the worklog and the training data (206). For example, the source identifier 128 may determine if the worklog of the incident ticket 106*a* was used to generate the generated resolution content.

In another example, if the description of the incident ticket 106*a* is used as input to the domain-specific LLM and is therefore not the source of the resolution content, then the source identifier 128 determines source content within the relevant training data. For example, using the training analysis results 124, the source identifier 128 may determine that the source is a relevant cluster of training data and associated metadata.

A hallucination score may be assigned to the at least one resolution statement, based on the source data, to identify hallucinated content within the at least one resolution statement (208). For example, the score generator 134 may use weights determined by the weight selector 130 and factor values determined by the factor generator 132 to calculate a value for the hallucination equation, as described above.

The at least one resolution statement may be modified to remove the hallucinated content and thereby obtain a resolution for inclusion in the resolution field (210). For example, the content handler 136 may delete a hallucinated word or other content from a resolution, so that the resulting resolution may be included in the resolution field of the incident ticket 106*a*. In some cases, the generated, hallucination-free resolution may be generated during resolution efforts of the incident agent 111, in which case the generated resolution may not be successful and may be added to the developing worklog as an unsuccessful resolution. In other examples, if the generated resolution is successful, corresponding actions and steps may be taken by the incident agent 111 to resolve the incident for the user 105, using suitable functionality of the help desk manager 110. Once a hallucination-free successful resolution is added to the resolution field of the incident ticket 106*a*, the incident ticket 106*a* may be closed, added to the ticket data repository 109, and used in future training efforts of the training engine 126 to incrementally improve operations of the help desk manager 110 over time.

Figure 3:
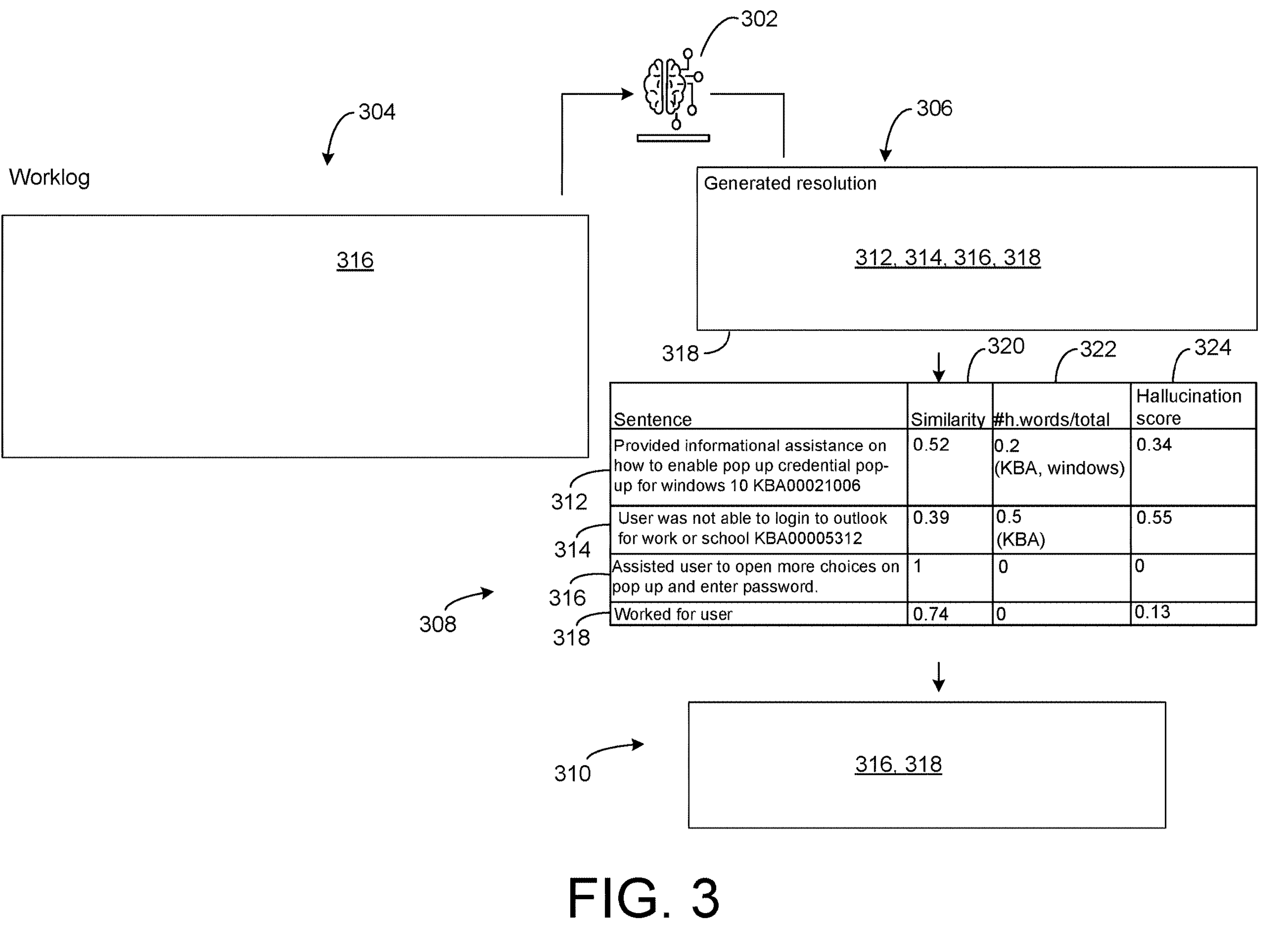
FIG. 3 illustrates a first example implementation of the system of FIG. 1.

FIG. 3 illustrates a first example implementation of the hallucination detection and correction system for domain-specific machine learning models 100 of FIG. 1. In FIG. 3, a domain-specific LLM 302 inputs a worklog 304 and outputs a generated resolution 306. A table 308 illustrates example hallucination detection results, using the techniques of FIGS. 1 and 2. Using the techniques described herein, a modified generated resolution 310 may be provided, which is hallucination-free and provides an improved resolution for the corresponding incident ticket 106*a*.

An example of worklog 304 may include: Had chat with user on live agent regarding outlook credential pop-up. Assisted user to open more choices on pop up and enter password. Worked for user, acknowledged. Somehow after ending chat I lost chat conversation Hello As per our last interaction over live agent your issue has been resolved hence I will resolve the incident but please don't hesitate to contact me if you have any other concerns with this. INCIDENT: PDINC0003667059. INCIDENT: "Request assistance for outlook credential pop-up". Provided informational assistance. I would be grateful if you could find the time to fill out the survey if you receive one as this helps IT service desk to continually improve our service to you. If for any reason you feel this incident is not progressing properly, please discuss it with me or contact to. Regards, . . . . Technical support analyst. IT service desk.

An example of a generated resolution as represented by the generated resolution 306 may include: Provided informational assistance on how to enable pop up credential pop-up for windows 10 KBA00021006. User was not able to login to outlook for work or school KBA00005312. Assisted user to open more choices on pop up and enter password. Worked for user.

An example of a modified generated resolution (AI generated) as represented by 310 may include: Assisted user to open more choices on pop up and enter password. Worked for user.

The generated resolution 306 includes sentences 312, 314, 316, 318, which may be included within the generated resolution 306 as noted above, and also reproduced as rows within the table 308. In the simplified example of FIG. 3, the table 308 only includes the first two weights (alpha, beta) and corresponding factors (similarity, hallucination ratio) of the hallucination equation. For example, values of the remaining weights gamma, delta, theta, zeta may be set to zero.

As shown in FIG. 3, the column 320 illustrates example (inverse) similarity scores (source_similarity) for each sentence/row 312, 314, 316, 318. In particular, the sentence 312 of "Provided informational assistance on how to enable pop up credential pop-up for windows 10 KBA00021006" is illustrated as having a similarity score of 0.52, and shares a partial similarity with sentence "Provided informational assistance" in the worklog 304.

A sentence 314 of "User was not able to login to outlook for work or school KBA00005312" is illustrated as having a similarity score of 0.39 and does not share significant similarity with a particular sentence in the worklog 304. The sentence 316 of "Assisted user to open more choices on pop up and enter password" is illustrated as having a similarity score of 1 because it also appears as sentence 316 in the worklog 304. The sentence 318 of "Worked for user" is illustrated as having a similarity score of 0.74 because it is significantly similar to the sentence "Worked for user, acknowledged" in the worklog 304.

Column 322 of the table 308 illustrates parameter values for the source words overlap factor, which, as described, captures a proportion of potentially hallucinated words in a sentence to total words in the sentence. In the present context, potentially hallucinated words may be defined as words that appear in the generated resolution sentence but not in the worklog 304. In FIG. 3, the sentence 312 is shown as having a value of 2 due to the presence of a hallucinated KBA identifier and the word windows, while the sentence 314 is shown as having a value of 0.5 due to the presence of a hallucinated KBA identifier. Note that, as described above, the source words overlap value may be calculated without using stop words or word inflections. For example, words such as "on," "to," or "for" may be omitted in the calculation.

A column 324 includes calculated hallucination scores for each sentence, calculated as weighted sums of the corresponding similarity and source word overlap scores in each row. As shown, the hallucination scores 0.34 and 0.55 of the sentences 312 and 314, respectively, may be above a hallucination threshold of, e.g., 0.3. On the other hand, the hallucination scores 0 and 0.13 of the sentences 316 and 318, respectively, may be below the hallucination threshold. Consequently, in the retained, modified resolution 310, the sentences 316, 318 are included, while the sentences 312, 314 are omitted.

Figure 4:
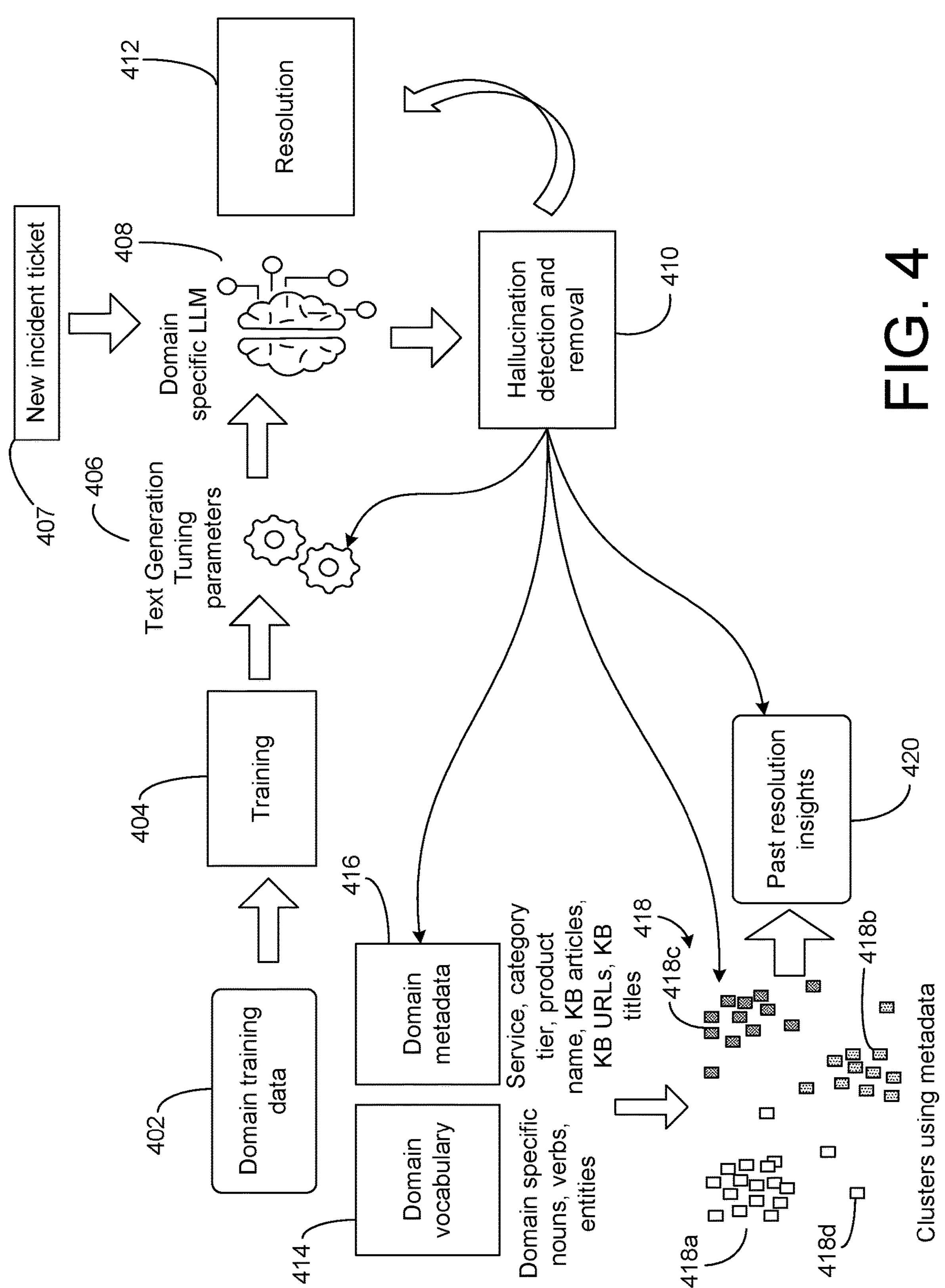
FIG. 4 is a block diagram of a more detailed example implementation of the system of FIG. 1.

FIG. 4 is a block diagram of a more detailed example implementation of the hallucination detection and correction system for domain-specific machine learning models 100 of FIG. 1. In the example of FIG. 4, domain training data 402 represents the type of resolved incidents that may be stored in the ticket data repository 109 of FIG. 1. During subsequent training 404 (e.g., using the training engine 126 of FIG. 1), various text generation tuning parameters 406 (e.g., hyper-parameters) may be set or configured to provide a domain-specific LLM 408.

Once a new incident ticket 407 is received, the trained domain-specific LLM 408 provides a resolution (similar to the generated resolution 306 of FIG. 3) that is then analyzed for hallucination detection and removal 410. Once any hallucinated content is detected and removed, a final resolution 412 may be provided.

FIG. 4 further illustrates examples of the types of training analysis described with respect to FIG. 1. For example, the hallucination detection processes may utilize domain vocabulary 414 (including all relevant domain-specific nouns, verbs, and entities) and domain metadata 416 (including, e.g., information related to services, categories, tiers, product names, KB articles, KB URLs, and KB titles) of the domain training data 402.

Resulting clusters 418, including a cluster 418*a*, 418*b*, and 418*c* are generated using, e.g., the domain metadata 416. In some cases, a particular incident ticket, e.g., incident ticket 418*d*, may not match any defined cluster sufficiently to be included therein. Thus, past resolution insights 420 represent and include any information that can be determined from the clusters 418, including, e.g., potential source data for out-of-source inputs to the domain-specific LLM 408, as referenced above and described in more detail, below, e.g., with respect to FIGS. 6-8

Figure 5:
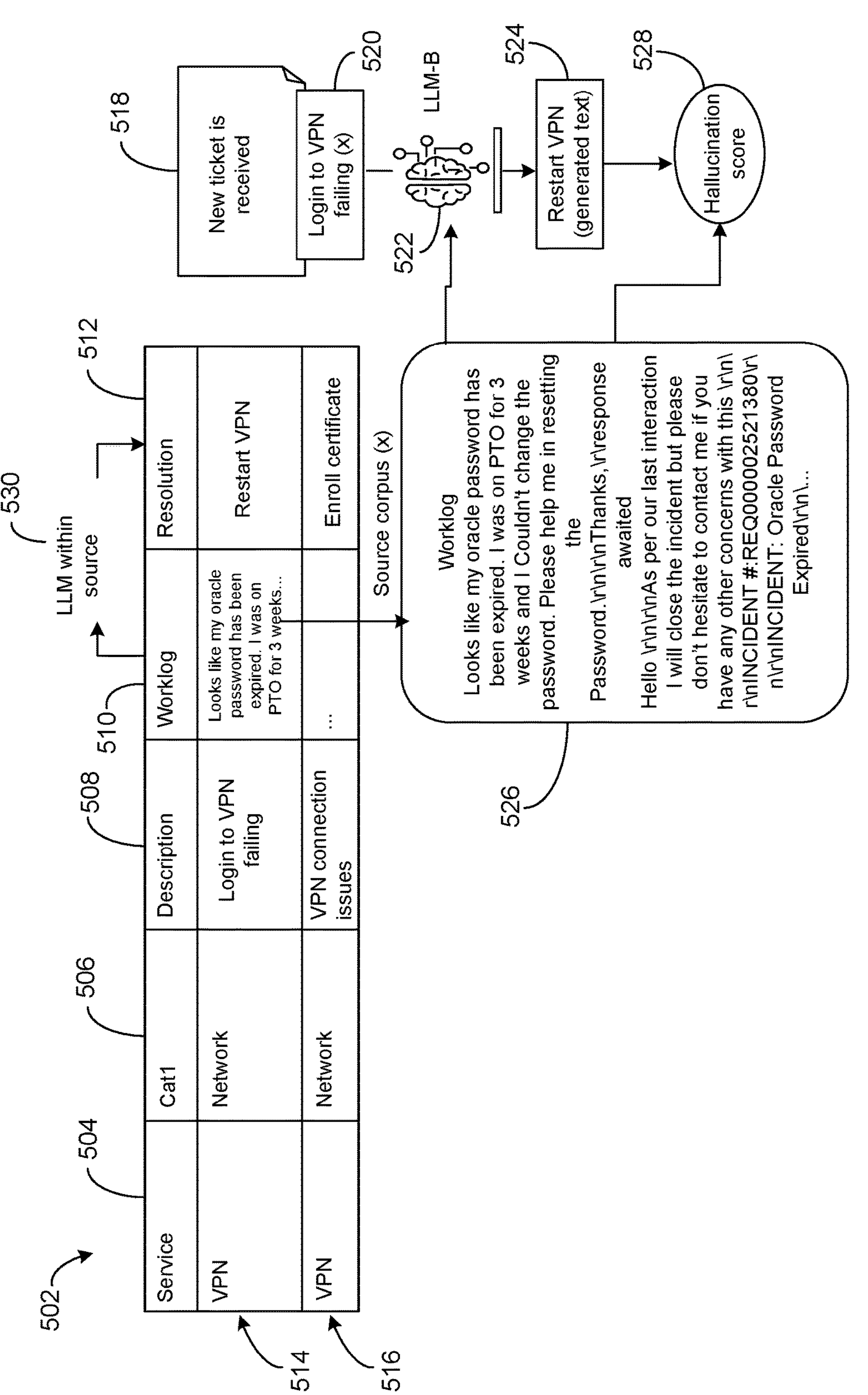
FIG. 5 illustrates an example implementation of the system of FIG. 1 when a resolution is generated from an input source.

FIG. 5 illustrates an example implementation of the hallucination detection and correction system for domain-specific machine learning models 100 of FIG. 1 when a resolution is generated from within an input source. In FIG. 5, a table 502 represents a plurality of incident tickets 106*a* of FIG. 1 and associated data and metadata. In table 502, a column 504 includes service information, a column 506 includes category information, a column 508 includes incidents' descriptions, a column 510 includes incident worklogs, and a column 512 includes resolutions. Thus, a row 514 includes data from an incident ticket, such as the incident ticket 106*a* of FIG. 1, while a row 516 includes data from a separate incident ticket 106*a*.

In the example, when a new ticket is received (518) with a described problem 520 of "login to VPN failing," corresponding to the description in column 508 of row 514 of the table 502, a LLM 522 may generate a solution 524 from a corresponding worklog 526 of "restart VPN."

A hallucination score 528 may then be computed using the hallucination equation described above. The example illustrates resolution generation from within a within-source LLM 530, the corpus of a worklog, e.g., the worklog 526, so that the generated solution 524 should be found within the input text. Similar to the example of FIG. 3, above, at least the weights alpha and beta, and corresponding hallucination factors, may be calculated and summed to find the hallucination score 528. In addition, although not illustrated above in the simplified example of FIG. 3, but discussed in various examples, below, any of the remaining weights gamma, delta, epsilon, theta, and zeta, and corresponding hallucination factor values, may be determined for the example of FIG. 5.

Figure 6:
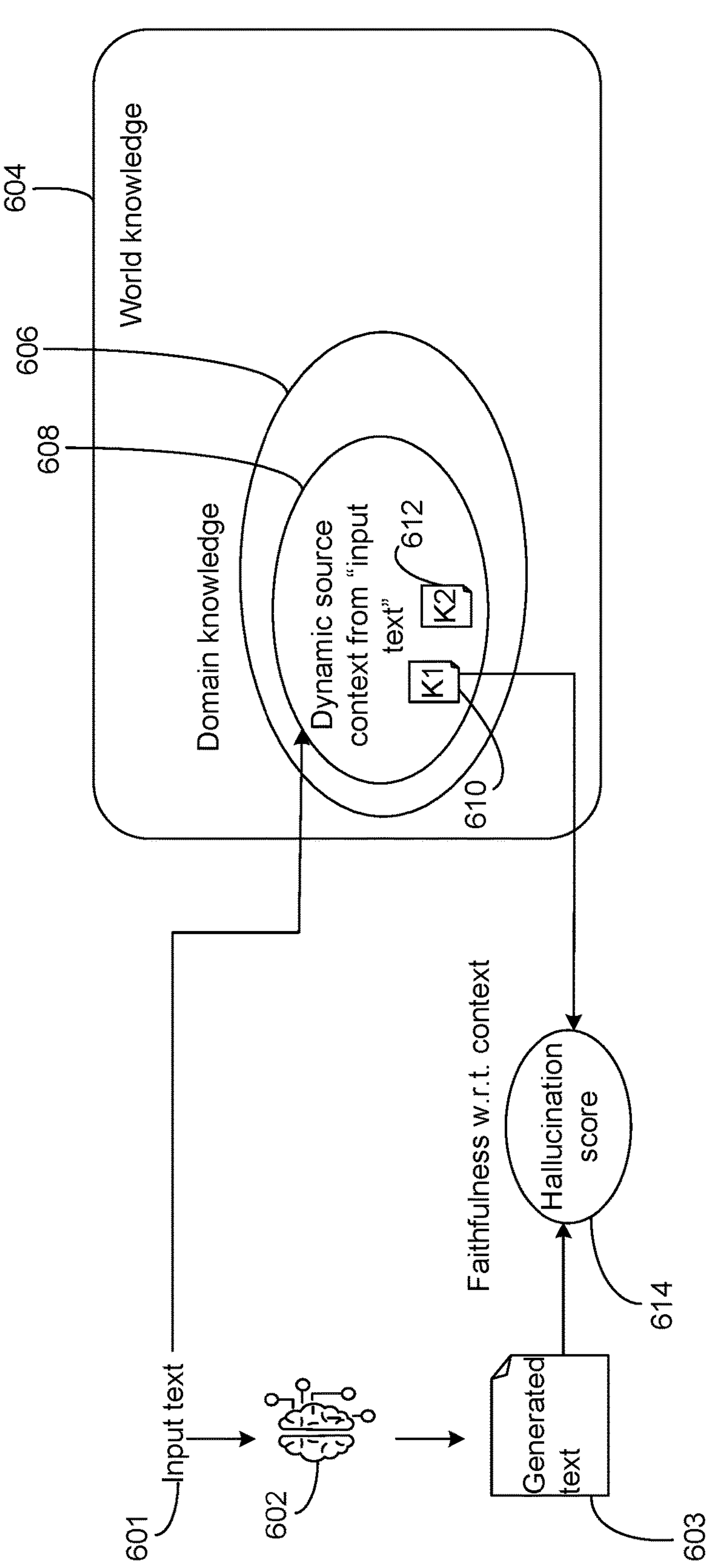
FIG. 6 illustrates differences in hallucination scores based on source context.

FIG. 6 illustrates differences in hallucination scores based on source context. Whereas FIG. 5, similar to FIG. 3, illustrates an example of generating a resolution from within an input text (worklog 526), the example of FIG. 6 relates to generating a resolution from outside of an input text 601, i.e., when a domain-specific LLM 602 is used to provide generated text 603 from the input text 601. For example, the input text 601 may represent a description of the description field of the incident ticket 106*a* of FIG. 1.

Thus, the generated text 603 is not derived from the input text 601, but is generated from embedded knowledge that is within the domain-specific LLM 602 as a result of training performed with relevant training data, as described herein. Although such training can be performed with general world knowledge 604 as a source of training data, described techniques describe the domain-specific LLM 602 by performing training only with domain knowledge 606, as also described above. Nonetheless, such domain knowledge 606 may still be too extensive or dissimilar to the input text 601 and/or the generated text 603 to provide meaningful hallucination detection.

Instead, described techniques may be used to match the input text 601 with relevant training data within the domain knowledge 606, where such relevant training data is described herein as a source corpus or source context for the input text 601.

For example, the input text 601 may be matched to an existing cluster as the dynamic source context 608, such as when a service, category, or product of the input text is matched to a corresponding, existing cluster of the same type. For example, if the input text relates to a VPN connection issue, then the dynamic source context 608 may include all sentences, in both input and output fields of corresponding incident tickets, used in solving any VPN issue. Instead of, or in addition to, clustering techniques, the dynamic source context 608 may be determined using other techniques, such as search techniques or resolution insights.

Within the dynamic source context 608, multiple incident tickets, e.g., K1 610 and K2 612, may be included, and one or more sentences from within one or more incident ticket(s) that is or are maximally similar to the input text may be used to compute a hallucination score 614. For example, K1 610 may have a sentence(s) with a similarity score of 0.8 with the input text 601, while K2 612 may have a sentence with a similarity score of 0.5, so that K1 610 is selected. In other examples, multiple sentences from one or more incident tickets may be aggregated to form a source corpus.

In other words, the computations described above with respect to FIG. 5 for calculating the hallucination equation may be repeated, but replacing the worklog 526 as the source corpus or context with the dynamically generated source corpus of aggregated similar sentences. In particular, the source corpus semantic similarity hallucination factor associated with the weight alpha and the source corpus word overlap hallucination factor associated with the weight beta may be calculated using the dynamically generated source corpus.

Figure 7:
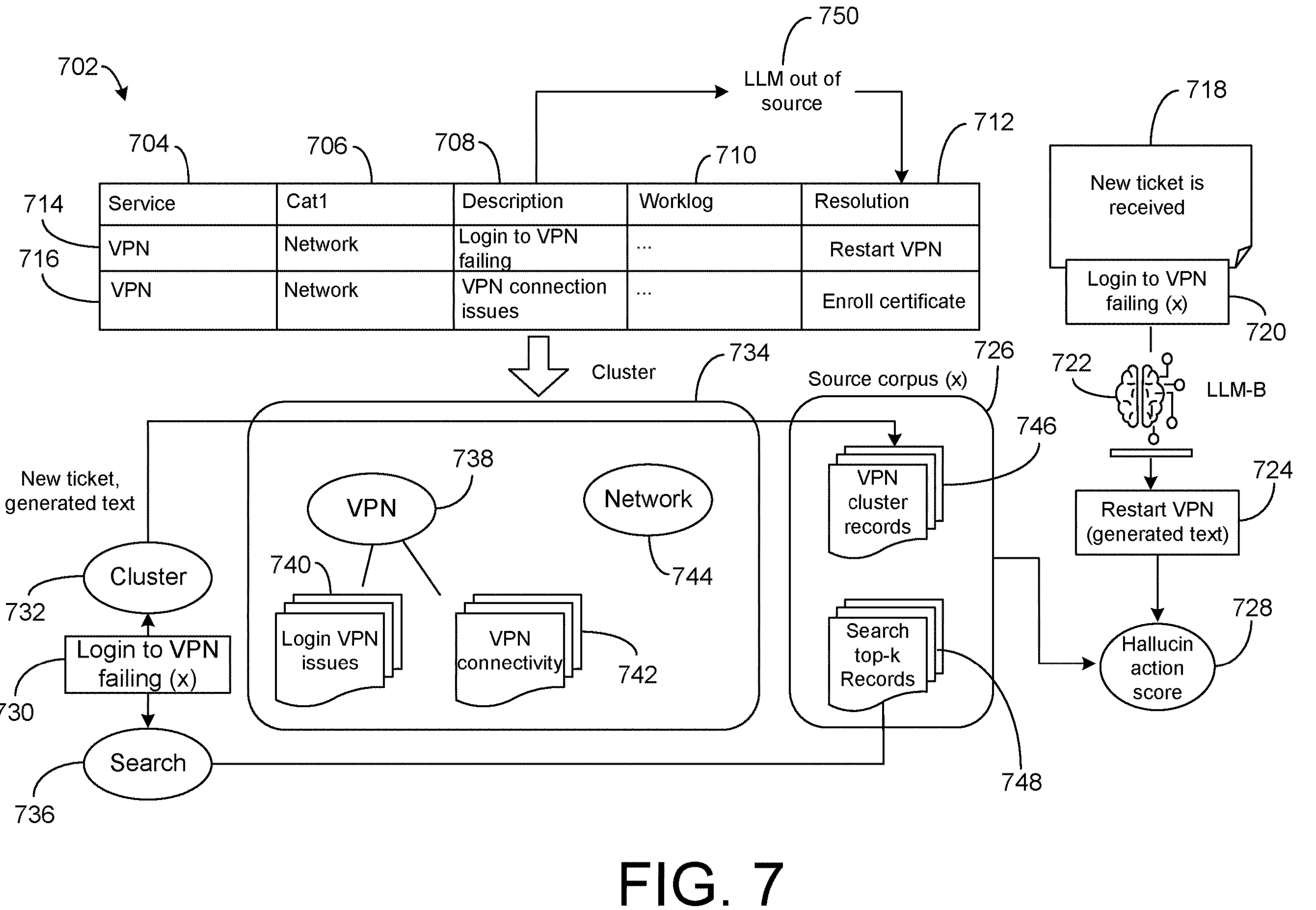
FIG. 7 illustrates an example implementation of the system of FIG. 1 when a resolution is generated from an out-of-input source.

FIG. 7 illustrates a more detailed example implementation of the hallucination detection and correction system for domain-specific machine learning models 100 FIGS. 1 and 6 when a resolution is generated from an out-of-input source. In FIG. 7, similar to FIG. 5, a table 702 represents a plurality of incident tickets and associated data and metadata. In table 702, a column 704 includes service information, a column 706 includes category information, a column 708 includes incident descriptions, a column 710 includes incident worklogs, and a column 712 includes resolutions. Thus, a row 714 includes data from an incident ticket, such as the incident ticket 106*a* of FIG. 1, while a row 716 includes data from a separate incident ticket 106*a*.

In the example, when a new ticket is received 718 with a described problem 720 of "login to VPN failing," corresponding to the description in column 708 of row 714 of the table 702, a LLM 722 may generate a solution 724 using knowledge embedded in the LLM 722, even though no corresponding worklog is present in column 710 at this point in the workflow.

Instead, a hallucination score 728 may then be computed using the hallucination equation as applied to a source context or source corpus 726 that is dynamically identified using the techniques described with respect to FIG. 6. Specifically, as explained with respect to FIG. 6, input text 730 (which is the same as the input text 720 but shown with a different reference numeral for the sake of clarity) may be used to perform a search on clusters 732 of available clusters of domain knowledge 734 (analogous to the domain knowledge 606 of FIG. 6), and/or may be used to perform a semantic search 736 of available domain knowledge or training data.

Clusters 734 may include a VPN cluster 738, which may include a set of incident tickets 740 related to VPN login issues and a set of incident tickets 742 related to VPN connectivity. A network cluster 744 is also included in the clusters 734, but does not contain incident tickets relevant to the input text 720/730.

As a result of the search on clusters 732, a set of VPN cluster records 746 may be included in the source corpus 726. Similarly, the semantic search 736 of available domain or training data may result in a number of top-k of most-similar records 748 within the source corpus 726. As described with respect to FIG. 6, the source corpus 726 may be limited to a set of sentences of the identified incident ticket records 746, 748 that are most similar to the input text 720, 730.

In more detail, for the input text 720, 730, the described searches 732, 736 may be executed based on available metadata fields, such as Service, Category, or product name to find one or more sets of incident ticket records having a high similarity to the input text 720, 730. A set {sentences} of minimally or maximally similar sentences within the determined records 746, 748 may be determined, which define the source corpus 726 and effectively define a surface area to which the generated resolution 724 should adhere.

To facilitate use of the source corpus 726, record identifiers from which each sentence in {sentences} originated may be tracked. For example, Table 1 illustrates an example of the source corpus 726 for the VPN context, and a second source corpus for "Teams". As shown, each source corpus may include sentences from different incident ticket records, while it is also possible that a single incident ticket record, such as Inc-6655 in Table 1, may appear in multiple clusters and in more than one source corpus.

TABLE 1

| Service | Record ID | Sentences in source corpus |
|---|---|---|
| VPN | Kb-5 | Enroll VPN certificate |
| | Inc-5955 | Reenroll certificate |
| | Inc-6655 | Restart Server |
| Teams | Inc-6655 | Teams audio not working |
| | Kb-72 | Teams configuration settings changed |

The example of FIG. 7 thus illustrates resolution generation (750) from a description that is out of source with respect to a worklog of column 710. For example, the resolution 724 may be generated from the description 720 upon receipt of the description 720, and prior to a worklog being developed. Instead, as described, the source corpus 726 is dynamically identified, so that the generated resolution 712 may have the hallucination score 728 calculated with respect thereto.

Thus, described techniques of FIG. 7 may notify users as to whether generated text is factual, e.g., by ensuring that each sentence of the generated text has a high semantic similarity with the dynamically generated source corpus 726. By finding and including the highest matching, semantically similar sentence(s) in the source corpus 726, with a semantic similarity greater than a user-configured threshold (e.g., 0.8), associated record IDs of Table 1 may be tracked for use in computing the hallucination score.

For example, for the generated text "You need to enroll Cisco certificate," a sentence similarity with respect to the source corpus 726 may reveal that the generated text is similar to "Enroll VPN certificate" with a cosine similarity score of 0.90. Since this similarity score is above the hypothetical threshold of 8, this sentence may be identified as having a source that includes the record [kb-5] in Table 1.

The generated text may thus be tagged with the record [kb-5], and may be provided, e.g., to the incident agent 111. In this way, the incident agent 111 may be provided with confidence that the generated text is factual and not hallucinated, and may be provided with the record [kb-5] as a resource in resolving a current incident, or future similar incidents.

Similar to the examples of FIGS. 3 and 5, the various weights and associated hallucination factor values of the hallucination equation may be determined in order to generate the hallucination score 728. In particular, as described with respect to FIG. 6, the source corpus semantic similarity hallucination factor associated with the weight alpha and the source corpus word overlap hallucination factor associated with the weight beta may be calculated using the dynamically generated source corpus 726. Any of the remaining weights gamma, delta, epsilon, theta, and zeta, and corresponding hallucination factor values, may also be calculated for the example of FIG. 7.

The example of FIG. 7 illustrates that dynamically generating a source corpus or source context for input text effectively allows the LLM 722 to learn about new words being introduced into the vocabulary. For example, if the term "iphone 15" were detected in generated resolution text prior to its release, it might be identified as hallucinated content. Once released, however, it would be likely to be included in the source corpus (e.g., within the searched-for top-k records 748) and would therefore appear as non-hallucinated output. Advantageously, this result does not require model retraining, nor any additional effort on the part of a user (e.g., the incident agent 111).

Figure 8:
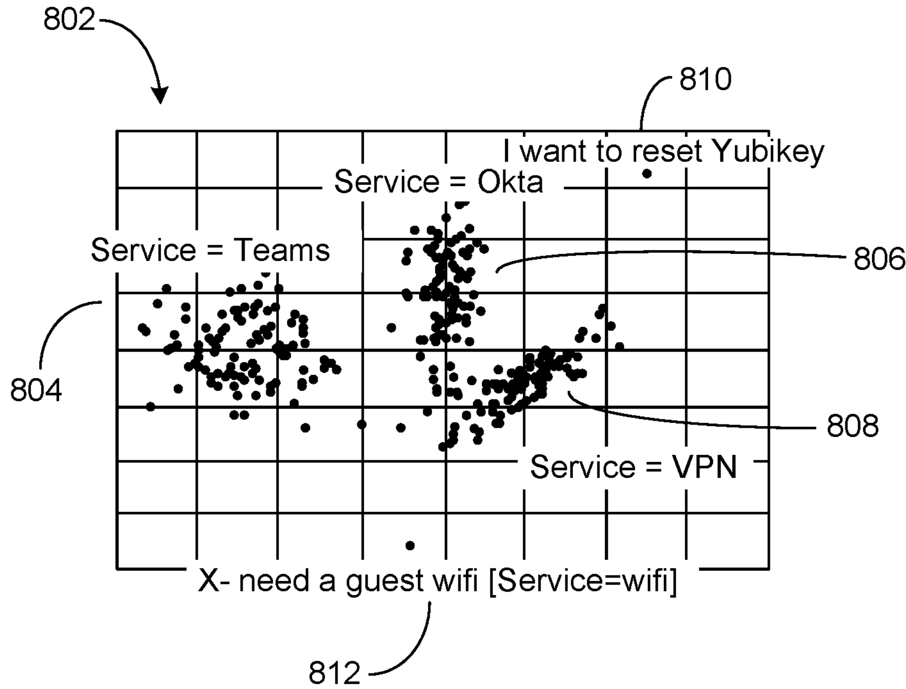
FIG. 8 is a scatter plot illustrating domain clusters of FIG. 1 that may be used in the examples of FIGS. 5-7.

FIG. 8 is a scatter plot 802 illustrating domain clusters of the hallucination detection and correction system for domain-specific machine learning models 100 FIG. 1 that may be used in the examples of FIGS. 5-7. FIG. 8 illustrates clustered training data, e.g., clustered by the cluster generator 122 of FIG. 1 and/or similar to clusters 734 of FIG. 7. In the example of FIG. 8, a cluster 804 is associated with the service Teams, a cluster 806 is associated with a service Okta, and a cluster 808 is associated with a service VPN.

In FIG. 8, input 810, having a description/input text of "I want to reset Yubikey," and input 812, having a description/input text of "need a guest wifi" for a service: Wifi, are received. FIG. 8 thus illustrates, for example, that if input text 810 is received, the techniques of FIG. 7 are likely to result in there being a small or nonexistent source corpus 726 for such input text. Consequently, resolution text generated from the input text 810 will be more likely to be found to include hallucinated content. Similarly, input text associated with the service Wifi will be unlikely to be associated with a significant source corpus 726 (since there will be no corresponding cluster) and will also be more likely to be associated with hallucinated content.

Thus, for example, when calculating the hallucination equation alpha*(1-source_similarity)+beta*(source word overlap)+gamma*(Out of Vocabulary (OOV))+delta*(Out of Domain (OOD)_metadata)+epsilon (1-input_similarity)+theta*((OOD))+zeta*(text_generation_tuning parameters), which is reproduced here for convenience, a resolution generated from input text 810 may score poorly (e.g., have a high value) for the (1-input_similarity) factor with the weight epsilon, as well as for the source word overlap factor with the weight beta, and/or other factors such as the OOV factor, the OOD factor, and the OOD_metadata factor. Similarly, comments would apply to the input 812. Note that as additional inputs related to "Yubikey" are received in the future, such inputs will begin to score well on the input_similarity factor, and eventually a cluster of Yubikey-related records may exist to serve as a source corpus.

In the above examples of FIGS. 5-8, described techniques thus generate potential resolutions at various stages in an incident handling process. Resolutions may be generated with hallucinated content removed, or included but marked as potential hallucinated content that is lacking sufficient source material in training data. In other examples, generated resolution statements that are determined to be unlikely to include hallucinated content may be provided with an identification (e.g., a link) to identified source material.

As any and all such examples of generated resolution content is generated by a domain-specific LLM, users (e.g., incident agents 111) may provide explicit feedback, such as confirming that generated content is acceptable, or that content marked hallucinated is indeed incorrect or not helpful. Users 105 may also provide implicit feedback, such as when the user 105 does not discard or edit the generated text and accepts it at face value. Implicit feedback therefore does not require separate action on the part of the user 105, and, with more usage, the system may thus automatically generate new training data.

It is also possible to use hard negative sampling to generate training data. For example, when feedback data is scarce, such as at times close to initialization of a hallucination detection system, hard negative sampling can be retained as examples of what not to do when performing hallucination detection.

For example, assume a sequence-to-sequence model with a pair (D="VPN connection issues"; R="Restart VPN service") that exists in training data of the model, where D: input text and R: ground truth resolution field. Then, a positive training record may be determined to include: [Service=VPN, D="VPN connection issues", R="Restart VPN service", hallucination equation score<0.3]→[Not Hallucinated].

For each Service, a set of Resolutions denoted by (S, {R}) that are possible may be computed. For the R="Restart VPN service", the 10 farthest ("hard negative") resolutions that do not match, i.e., "Service!=VPN", may be identified, those resolutions that are "most dissimilar" from any resolution R in this Service source corpus may be identified. For example, a hard negative example for the VPN issue—"Fix VPN connection issues" might include picking a Teams service and a resolution of "Fixing audio by configuring Teams". Or more specifically: [Service=VPN, D="VPN connection issues", R="Fixing audio by configuring Teams", hallucination equation score>0.85]→[Hallucinated]. As the above example illustrates, it is thus possible to generate rows that are hallucinated and not hallucinated from training dataset.

FIG. 9A is a table 902 illustrating a format for collection of the types of records just referenced that may be used for training a classifier using the above-described techniques. Table 902 illustrates that, for each record (row), the various hallucination factors of the hallucination equation may be determined, along with corresponding metadata such as Service or Category. A predicted hallucination (yes or no) may thus be classified as a correct positive, a false positive, a correct negative, or a false negative.

Thus, once enough data with hallucinated and non-hallucinated feedback data exists, it is possible to train the hallucination detector 118 of FIG. 1 as a classifier to predict hallucination, with example characteristics shown in the graphs of FIG. 9B, as described below. Various methods can be used to define the classifier, such as supervised training, or weak supervision by treating each of the hallucination factors as labelling functions.

The resulting classifier will thus learn optimal weights to be associated with each of the hallucination factors, so that future content may be classified as hallucinated or not. Moreover, the trained classifier will be unique to each metadata class, such as services or categories. In other words, with respect to the example of FIG. 8, it may occur that some clusters have more and/or higher-quality training data than other clusters, so that relevant incident tickets **106*a*** will have more accurate resolutions generated. The trained classifier will thus be less likely to detect hallucination for such clusters, while being relatively more likely to detect hallucination for clusters with less training data or lower-quality training data.

Figure 9B:
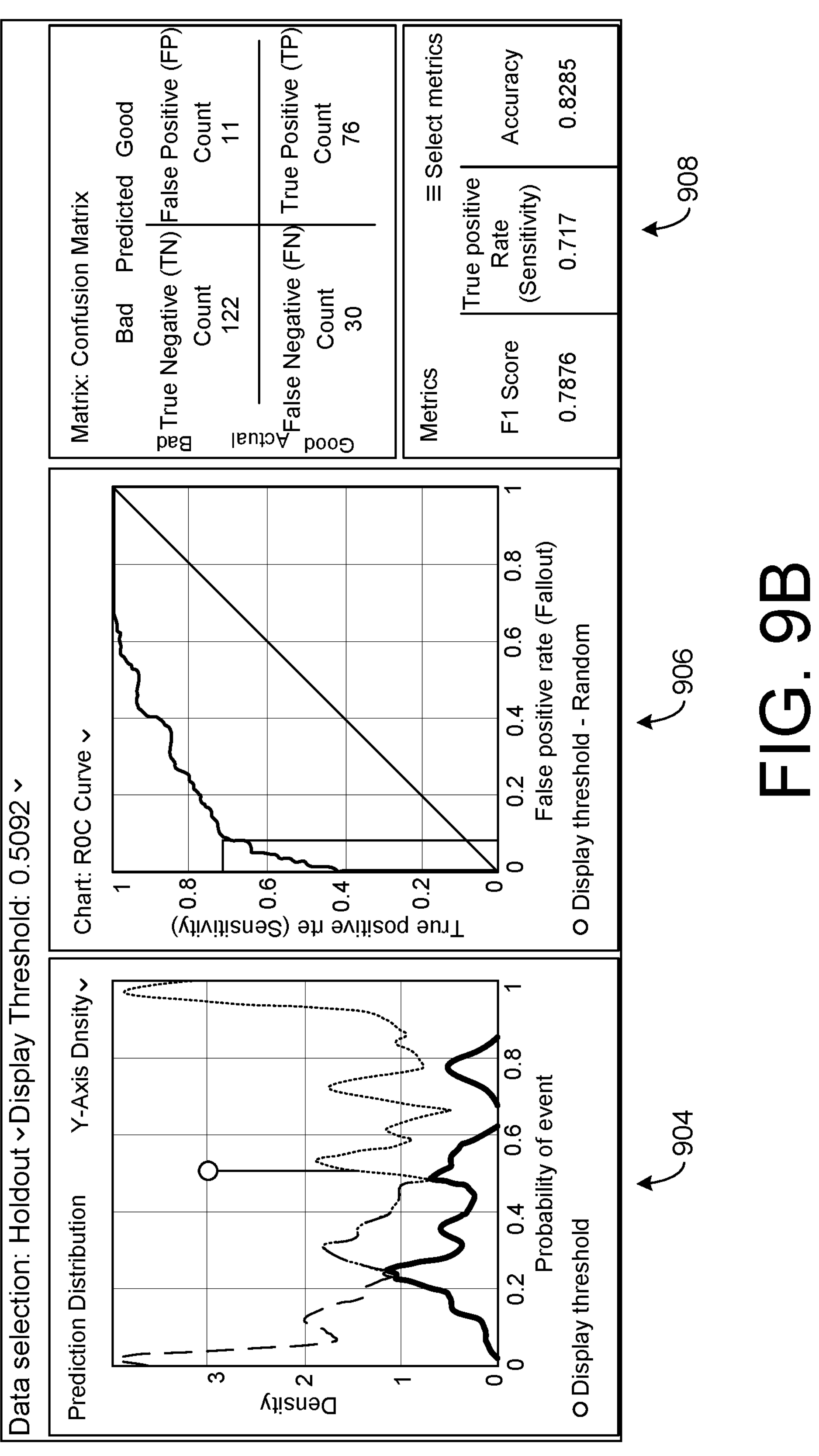
FIG. 9B illustrates graphs demonstrating example classifier characteristics for the example of FIG. 9A.

The graphs of FIG. 9B illustrate a prediction distribution 904 and a receiver operating characteristics (ROC) curve 906 associated with various example classifier metrics 908. As shown, the classifier metrics 908 include a confusion matrix showing true negatives and false positives as negative/bad actual results, with false negatives and true positives as positive/good actual results, while true negatives and false negatives are determined as negative/bad predicted outcomes, and false positives and true positives are shown as positive/good predicted outcomes.

Additional metrics characterizing the classifier being trained are shown as an F1 score, which provides a precision metric, a sensitivity score, and an accuracy score. These metrics may be determined from the prediction distribution graph 904 and the ROC curve 906. For example, the prediction distribution graph 904 illustrates a distribution of actual negative values (to the left of the graph) and positive values (to the right of the graph) in relation to a display threshold that provides a dividing line for interpreting results. That is, every prediction to the left of the dividing line is classified false and every prediction to the right of the dividing line is classified as true. Thus, the prediction graph 904 visually predicts model performance for a given source of training data.

The ROC curve 906, meanwhile, plots a true positive rate vs. a false positive rate for a given training data set. The ROC curve is a known tool for assessing model quality, which demonstrates a tradeoff between sensitivity and specificity. The ROC curve 906 of FIG. 9B is distant from the 45 degree diagonal of the ROC space in the graph, which demonstrates high quality of the trained classifier.

Figure 10:
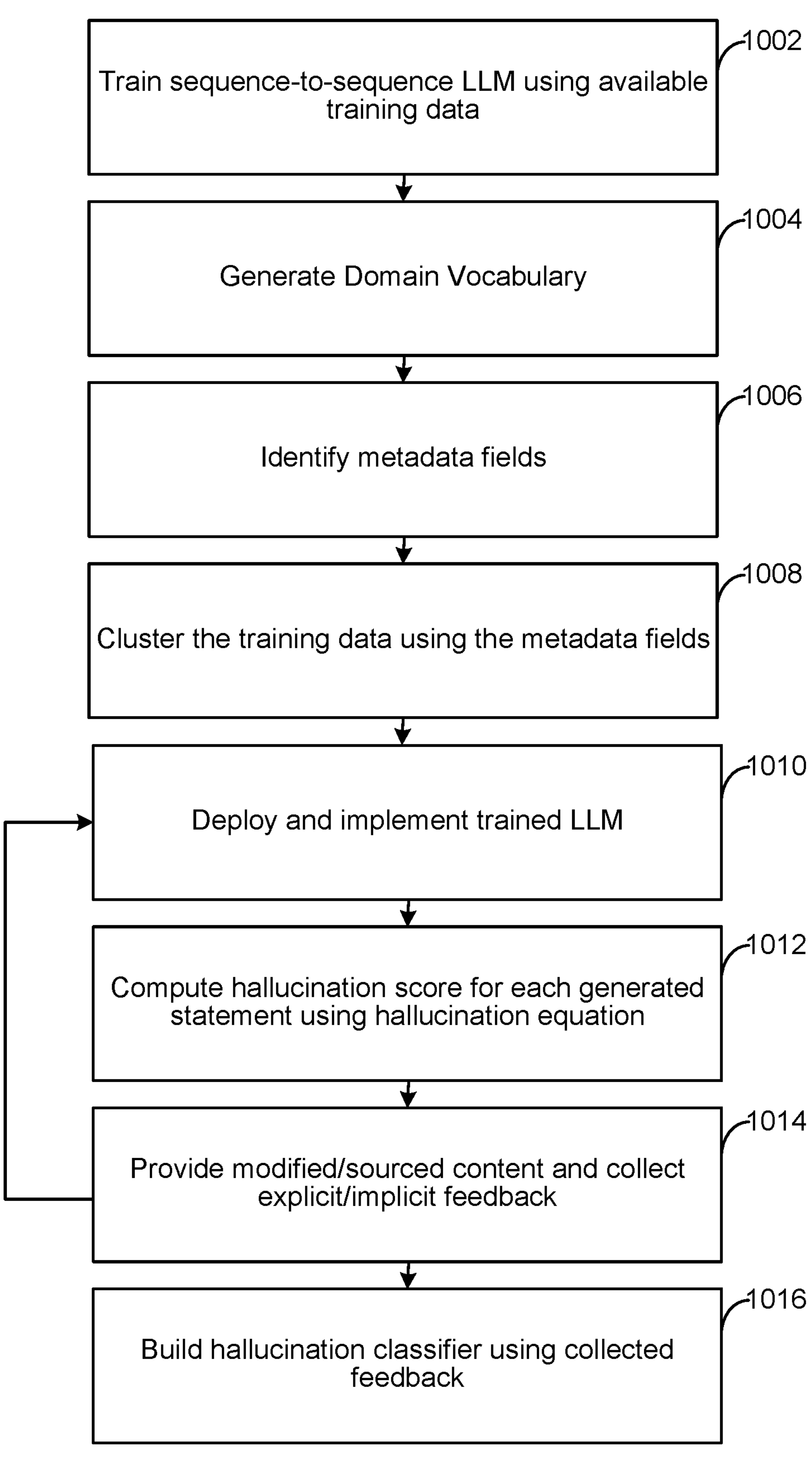
FIG. 10 is a flowchart illustrating more detailed example operations of the method of FIG. 2.

FIG. 10 is a flowchart illustrating more detailed example operations of the method of FIG. 2. In the example of FIG. 10, a sequence-to-sequence LLM may be trained using available domain training data (1002). The LLM's training may be finetuned using an input text field and output text field. The training data thus provides a ground truth dataset that identifies the set of data that has been used for training an LLM of the type {input text}→LLM→{output text}. The LLM may be identified as being either LLM_GENERATE_FROM_WITHIN_SOURCE (e.g., an LLM that will determine a generated resolution from a worklog) or LLM_GENERATE_FROM_OUT_OF_SOURCE (e.g., an LLM that will generate a resolution from an incident description). As described herein, a hallucination score will be calculated differently when using the hallucination equation, depending on this determination.

A domain vocabulary may be generated (1004). As described above, the domain vocabulary may include all non-generic nouns, verbs, and entities within the training data. For example, for the IT domain, the domain vocabulary may include knowledge articles, ticket data, asset, and service models.

One or more effective metadata fields may be identified in the training data (1006). Metadata fields may be selected that identify key characteristics used in organizing the training data. For example, as in the examples above, for incident ticket data, "service" or "category Tier 1/2/3", and "product name" are a few examples that may be used to organize the training data. Other examples of useful metadata fields may include associated KB articles, URLs, and titles.

The training data may be clustered into clusters using the metadata fields (1008). That is, the clusters may be generated based on the characteristics identified, such as service, category, or product name.

The trained LLM may then be deployed and implemented (1010) to process for inference by receiving new input text that is input to the LLM and used by the LLM to generate text. Each time such content is generated, and for each sentence in the generated text, the hallucination equation may be computed to obtain a hallucination score (1012).

For example, as described above, the various hallucination factors may be calculated based on whether the LLM instance in question is LLM_GENERATE_FROM_WITHIN_SOURCE or LLM_GENERATE_FROM_OUT_OF_SOURCE. In either case, a source corpus is determined for use in calculating the source corpus semantic-similarity factor and the source corpus word-overlap score. For WITHIN_SOURCE implementations, the source corpus may include an input worklog, as described with respect to FIGS. 3 and 5. For OUT_OF_SOURCE implementations, the source corpus may be dynamically derived from input text, as described with respect to FIGS. 6 and 7.

As also referenced above, the tuning parameters factor, associated with the weight zeta, may be calculated using values of various tuning parameters used when training the LLM. For example, some tuning parameters' values, and combinations of values, may be used to infer hints regarding the possibility of hallucinations in future generated text.

In the following discussion, various such tuning parameters are described with associated example values and combinations of values. As the various tuning parameters are generally known, they are not defined or described here in detail, but are rather included to provide examples of how to calculate a hallucination score using the hallucination equation. Consequently, other tuning parameters may be used, as well.

In specific examples, some tuning parameters or values may include: bad_words_ids (when not set, the output may contain the undesirable text), repetition_penalty==1 (no penalty on repetition of tokens), combination of number_beams==1 and do_sample==False (with this setting, the LLM effectively implements greedy decoding and is susceptible to repeating itself).

In example implementations, the above values may be initially included, e.g., with an equal spread of 0.025 to generate a text_generation_tuning_parameters_score within a range of 0 to 0.1. Many other values and combinations may be used. As described herein, and as with other weights assigned to the various hallucination factors, a classifier may be trained to dynamically optimize the weights, the included/excluded tuning parameters, and the combinations of tuning parameters used, over time as feedback is received.

Some other examples and details regarding tuning parameters that may be considered include, but are not limited to, bad_word_ids (a list of token ids that are not allowed to be generated), repetition penalty (with possible values of float, optional, or 1.0, where 1.0 is the default and means no penalty is applied), num_beams (number of beams for beam search, with possible values of int, optional, and 1.0, where 1.0 is the default and means no beam search), do_sample (with possible values of boolean, optional, and a default value of false; indicates whether or not to use sampling or greedy decoding, where sampling generally refers to randomly picking the next word according to its conditional probability distribution), top_k (with integer values, optional, with a default to 50, top_k represents a number of highest probability vocabulary tokens to retain for top-k filtering, and temperature (float, optional, with a default value of 1.0, this parameter is used to model next token probabilities, and is a number used to tune a degree of randomness of the model).

The generated content may be modified and/or sourced when provided, so that explicit or implicit feedback may be collected (1014). For example, when a generated resolution includes three resolution statements, a first resolution statement may be deleted entirely as being hallucinated and a second resolution statement may be modified (e.g., to remove a word found to be hallucinated). A third resolution statement may be provided with supplemental hallucination information, such as (a link to) a training data source to provide trust in the statement. It may also be possible to provide an indication of degree of trust, such as by providing the hallucination score calculated from the hallucination equation as an indicator of likelihood that the content is hallucinated.

As described herein, the preceding types of hallucination decisions and associated actions may initially be performed based on default or manually-adjusted weight values. However, the various preceding options may be provided with explicit mechanisms for feedback, such as enabling reviewing incident agents to agree or disagree with the determinations of hallucinated content.

After a certain amount of feedback is collected over time, and as described with respect to FIGS. 9A and 9B, a hallucination classifier may be built (1016). Thus, for example, during early iterations of hallucination detection, each statement in generated text may be scored and the resulting score may be compared against a hallucination threshold to determine whether to discard the statement. Such threshold-based techniques may provide a bootstrap method for detecting hallucinations, which can be built upon to build and deploy the type of classifier(s) described above. For example, the classifier may be constructed as a binary classifier that determines whether a sentence, with its context, is hallucinated or not.

Described techniques thus enable determination of a hallucination score of each statement of a plurality of generated statements, calculated using the hallucination equation described herein, or variations thereof. In the hallucination equation, each hallucination factor provides a measure of risk that the statement being evaluated and score is hallucinated.

Thresholds for hallucination can be determined at a lower bound when ground-truth is known. A ground-truth of generated text may be expected to yield a hallucination score close to 0, or 0.

Described techniques further enable hallucination detection methods for LLMs, including dynamically determining a source context based on a training dataset. Such techniques enable retrieval-based context augmentation that allows more up-to-date information since the training of LLM. Moreover, described techniques may be used to provide sources for each generated sentence, in order to improve a factualness and authenticity of the generated content.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatuses, e.g., a programmable processor, a computer, a server, multiple computers or servers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

analyze training data for a domain-specific machine learning model in conjunction with training of the domain-specific machine learning model, the training data including a plurality of resolved incident tickets, to thereby generate training analysis results;

receive an incident ticket of an incident domain, the incident ticket having a resolution field and a worklog field for a worklog providing a history of actions taken during attempts to resolve an incident;

process the incident ticket using the domain-specific machine learning model trained using the training data, to thereby output at least one resolution statement from the domain-specific machine learning model;

determine, after outputting the at least one resolution statement, source data used by the domain-specific machine learning model in providing the at least one resolution statement, the source data including one of the worklog and the training data;

assign a hallucination score to the at least one resolution statement, based on the source data and the training analysis results, to identify hallucinated content within the at least one resolution statement; and modify the at least one resolution statement, including removing the hallucinated content, to thereby obtain a resolution for inclusion in the resolution field.

2. The computer program product of claim 1, wherein the plurality of resolved incident tickets each include a completed worklog and a completed resolution.

3. The computer program product of claim 1, wherein the instructions, when executed, are further configured to cause the at least one computing device to:

generate a domain vocabulary from the training data as part of the training analysis results; and assign the hallucination score based in part on a comparison of the at least one resolution statement and the domain vocabulary.

4. The computer program product of claim 1, wherein the instructions, when executed, are further configured to cause the at least one computing device to:

identify metadata fields of the plurality of resolved incident tickets as part of the training analysis results; and generate clusters of the plurality of resolved incident tickets based on the metadata fields.

5. The computer program product of claim 4, wherein the instructions, when executed, are further configured to cause the at least one computing device to:

determine a metadata field of the incident ticket; and identify the source data within a cluster of the clusters having a metadata field that matches the metadata field of the incident ticket.

6. The computer program product of claim 5, wherein the instructions, when executed, are further configured to cause the at least one computing device to:

evaluating a similarity of content of incident tickets within the cluster with respect to an input of the domain-specific machine learning model; and identify the source data as including a subset of the content, based on the similarity.

7. The computer program product of claim 1, wherein the instructions, when executed, are further configured to cause the at least one computing device to:

determine a metadata field of the incident ticket;

perform a search of the training data, based on the metadata field, to obtain a subset of incident tickets from the training data using the training analysis results; and identify the source data as including content from the subset, based on a degree of similarity between the content and an input of the domain-specific machine learning model.

8. The computer program product of claim 1, wherein the instructions, when executed, are further configured to cause the at least one computing device to:

provide the resolution together with information identifying the source data within the training data.

9. The computer program product of claim 1, wherein the instructions, when executed, are further configured to cause the at least one computing device to:

assign the hallucination score using a hallucination equation defining an aggregated sum of hallucination factors, in which each hallucination factor is associated with a corresponding weight.

10. The computer program product of claim 9, wherein the instructions, when executed, are further configured to cause the at least one computing device to:

assign the hallucination score using a classifier trained to assign each weight of the hallucination equation.

11. A computer-implemented method, the method comprising:

analyzing training data for a domain-specific machine learning model in conjunction with training of the domain-specific machine learning model, the training data including a plurality of resolved incident tickets, to thereby generate training analysis results;

receiving an incident ticket of an incident domain, the incident ticket having a resolution field and a worklog field for a worklog providing a history of actions taken during attempts to resolve an incident;

processing the incident ticket using the domain-specific machine learning model trained using the training data, to thereby output at least one resolution statement from the domain-specific machine learning model;

determining, after outputting the at least one resolution statement, source data used by the domain-specific machine learning model in providing the at least one resolution statement, the source data including one of the worklog and the training data;

assigning a hallucination score to the at least one resolution statement, based on the source data and the training analysis results, to identify hallucinated content within the at least one resolution statement; and modifying the at least one resolution statement, including removing the hallucinated content, to thereby obtain a resolution for inclusion in the resolution field.

12. The method of claim 11, further comprising:

identifying metadata fields of the plurality of resolved incident tickets as part of the training analysis results; and generating clusters of the plurality of resolved incident tickets based on the metadata fields.

13. The method of claim 12, further comprising:

determining a metadata field of the incident ticket; and identifying the source data within a cluster of the clusters having a metadata field that matches the metadata field of the incident ticket.

14. The method of claim 13, further comprising:

evaluating a similarity of content of incident tickets within the cluster with respect to an input of the domain-specific machine learning model; and identifying the source data as including a subset of the content, based on the similarity.

15. The method of claim 11, further comprising:

providing the resolution together with information identifying the source data within the training data.

16. The method of claim 11, further comprising:

assigning the hallucination score using a hallucination equation defining an aggregated sum of hallucination factors, in which each hallucination factor is associated with a corresponding weight.

17. The method of claim 16, further comprising:

assigning the hallucination score using a classifier trained to assign each weight of the hallucination equation.

18. A system comprising:

at least one memory including instructions; and at least one processor that is operably coupled to the at least one memory and that is arranged and configured to execute instructions that, when executed, cause the at least one processor to:

analyze training data for a domain-specific machine learning model in conjunction with training of the domain-specific machine learning model, the training data including a plurality of resolved incident tickets, to thereby generate training analysis results;

receive an incident ticket of an incident domain, the incident ticket having a resolution field and a worklog field for a worklog providing a history of actions taken during attempts to resolve an incident;

process the incident ticket using the domain-specific machine learning model trained using the training data, to thereby output at least one resolution statement from the domain-specific machine learning model;

determine, after outputting the at least one resolution statement, source data used by the domain-specific machine learning model in providing the at least one resolution statement, the source data including one of the worklog and the training data;

assign a hallucination score to the at least one resolution statement, based on the source data and the training analysis results, to identify hallucinated content within the at least one resolution statement; and modify the at least one resolution statement, including removing the hallucinated content, to thereby obtain a resolution for inclusion in the resolution field.

19. The system of claim 18, wherein the instructions, when executed, are further configured to cause the at least one processor to:

determine a metadata field of the incident ticket;

perform a search of the training data, based on the metadata field, to obtain a subset of incident tickets from the training data using the training analysis results; and identify the source data as including content from the subset, based on a degree of similarity between the content and an input of the domain-specific machine learning model.

20. The system of claim 18, wherein the instructions, when executed, are further configured to cause the at least one processor to:

assign the hallucination score using a hallucination equation defining an aggregated sum of hallucination factors, in which each hallucination factor is associated with a corresponding weight.

* * * * *